United States Patent
Greene et al.

(10) Patent No.: US 6,654,449 B1
(45) Date of Patent: Nov. 25, 2003

(54) CONSTRUCTION OF LARGE, ROBUST, MONOLITHIC AND MONOLITHIC LIKE, AMLCD DISPLAYS WITH WIDE VIEW ANGLE

(75) Inventors: Raymond G. Greene, Endicott, NY (US); J. Peter Krusius, Ithaca, NY (US); Donald P. Seraphim, Vestal, NY (US); Dean W. Skinner, Vestal, NY (US); Boris Yost, Ithaca, NY (US)

(73) Assignee: Rainbow Displays, Inc., Endicott, NY (US)

( * ) Notice: Subject to any disclaimer, the term of this patent is extended or adjusted under 35 U.S.C. 154(b) by 225 days.

(21) Appl. No.: 09/721,820

(22) Filed: Nov. 27, 2000

Related U.S. Application Data
(60) Provisional application No. 60/177,447, filed on Jan. 21, 2000.

(51) Int. Cl.[7] .................................................. G02F 1/13
(52) U.S. Cl. .............................. 379/95; 379/67; 379/69
(58) Field of Search ............................... 349/69, 95, 67

(56) References Cited

U.S. PATENT DOCUMENTS

| | | | | |
|---|---|---|---|---|
| 4,019,808 A | * | 4/1977 | Scheffer | 349/112 |
| 5,262,880 A | * | 11/1993 | Abileah | 349/64 |
| 5,691,788 A | * | 11/1997 | Kim | 349/110 |
| 5,877,829 A | * | 3/1999 | Okamoto et al. | 349/110 |
| 6,023,316 A | * | 2/2000 | Yano | 349/112 |

\* cited by examiner

*Primary Examiner*—James Dudek
(74) *Attorney, Agent, or Firm*—Salzman & Levy

(57) ABSTRACT

The present invention features techniques for designing large, robust monolithic and monolithic-like displays having good brightness and contrast over a wide range of viewing angles. These techniques include controlling the layout of the pixel array and its access circuits that modify the electrical characteristics in order to minimize undesirable optical, electro-optical, and ambient light aberrations and any electronic anomalies creating visually perceptible discontinuities or boundaries. These artifacts are reduced to levels that allow for better color correction. In addition, the use of optical components such as collimators, light enhancing films, diffusers, screens, polarizers and masks are described. The resulting displays present luminance and chromaticity outputs from areas of originally varying optical response that become uniform within the tolerances of the human visual system.

28 Claims, 27 Drawing Sheets

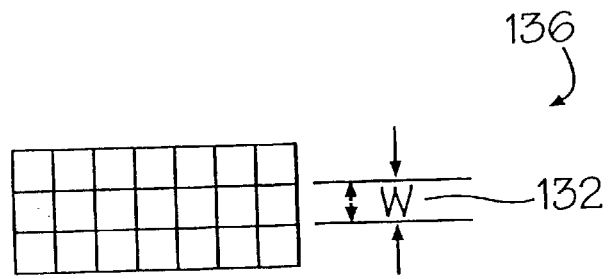
(a) Square
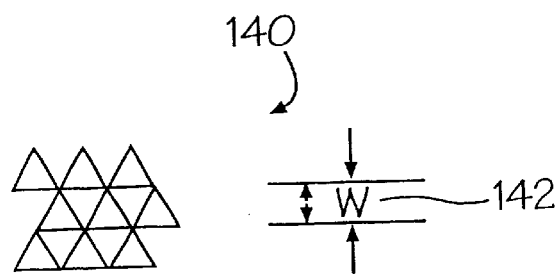
(b) Triangular
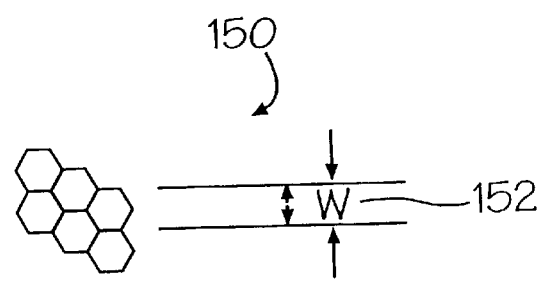
(b) Hexagonal
*Figure 3*

CONSTRUCTION OF LARGE, ROBUST, MONOLITHIC AND MONOLITHIC LIKE, AMLCD DISPLAYS WITH WIDE VIEW ANGLE

This application claims priority in accordance with 37 C.F.R. 1.78 to U.S. Provisional Patent Application Ser. No. 60/177,447 filed Jan. 21, 2000.

RELATED APPLICATIONS

The present application is related to U.S. Pat. No. 5,661,531, (RDI-102) U.S. Pat. No. 5,668,569 (RDI-103) U.S. Pat. No. 5,867,236 and to our copending U.S. patent application Ser. No. 09/024,481 filed Feb. 17, 1998, (RDI-112) Ser. No. 09/396,142 filed Sep. 15, 1999 (RDI118) Ser. No. 60/153,962 filed Sep. 15, 1999 and Ser. No. 09/322,047 (RDI-122) filed May 28, 1999, Ser. No. 09/407,619 filed Sep. 28, 1999, Ser. No. 09/406,977 filed Sep. 28, 1999 and Ser. No. 09/407,620 filed Sep. 28, 1999, all being commonly assigned to the assignee of the present invention and all included herein by reference.

FIELD OF THE INVENTION

This invention pertains to the design and manufacture of large flat-panel electronic displays and, more particularly, to the manufacture of AMLCD type, flat-panel displays assembled in a single monolithic or monolithic-like assembly, strengthened for structural integrity, corrected for brightness and hue variations due to optical or electro-optical aberrations and structural non-uniformities, equipped with lighting means and optical means that provide large view angles while improving acuity and contrast, and thin film wiring in said display that is designed to avoid or compensate for non-uniformities in pixel response, brightness, and chromaticity.

BACKGROUND OF THE INVENTION

Large displays can be constructed using several established display technologies, including cathode ray tubes (CRT) and projectors of the rear view type. However, as the diagonal size of these displays increases their volume and weight increase significantly. Further, manufacturing becomes more difficult and simultaneously the manufacturing cost greatly increases. An alternative approach to implementing large displays is provided by flat-panel displays, which offer a much reduced thickness and weight. The active matrix liquid crystal display (AMLCD) is the most mature of these technologies. The structure of an AMLCD consists of liquid crystal (LC) layer sandwiched between two thin glass plates with a thickness typically of 0.5 mm, 0.7 mm, or 1.1 mm. As the diagonal size of the AMLCD increases above about 20", the structural integrity of the sandwich becomes insufficient and hence the mechanical assembly should be strengthened for larger sizes. At the same time non-uniformities arising from manufacturing and operation dramatically increase and the manufacturing yield decreases. Today's AMLCD displays have several additional drawbacks in consumer applications. In particular, the view angles are limited to values much smaller than those of the CRT. In addition the brightness-energy efficiency is reduced by polarizers, light collimator means, and any screens used to enhance the view angles. If such direct view AMLCDs are to compete with CRTs in consumer applications, these deficiencies must be overcome.

Recent improvements in display technologies, as disclosed in above related patent applications, have been made to overcome these deficiencies or compensate for them in large tiled AMLCDs, in which the display is assembled from several smaller, independently fabricated pieces or tiles. Many of these improvements can also be applied to large monolithic displays. These improvements can help improve the characteristics of a monolithic or monolithic-like display or compensate for artifacts resulting from imperfect manufacturing of the components or their assembly. However the substantial structure differences between monolithic and tiled displays must be considered, when the new techniques are applied to monolithic ones. Monolithic displays have no mechanical discontinuities in the seams between adjacent tiles, a fact that substantially relaxes light collimation requirements, one of the key techniques used to hide the seam in tiled displays. As a consequence, the useable aperture ratio increases, screen specifications are altered, and the need for masks decreases. Therefore, the design of the optical stack and lighting in large monolithic or monolithic-like displays substantially changes compared to large tiled AMLCD displays.

The present invention describes unique designs and methods for fabricating or operating large monolithic, or monolithic-like, AMLCDs of both color and gray-scale types using many of the techniques developed for large tiled flat-panel displays (FPDs). Although this invention describes most of the techniques and methods in the context of AMLCDs, many of them can be applied to other transparent, light-valve type FPDs. Characteristic of such displays is that light from a uniform, back light source is transmitted through the display assembly towards the viewer located on the front side. The light valves control the amount of primary light rays transmitted through the apertures of the sub-pixels. The transmitted light from the sub-pixels mixes to form all desired brightness and hue combinations (color space) before it reaches the viewer located at the predefined viewing distance from the display. The techniques and methods transferred from tiled to large-scale monolithic flat-panel displays, augmented with other methods described herein, allow to significantly improve the performance of the latter, including viewing angle, image acuity, contrast, and color uniformity. At the same time these unique design improvements can be used to increase the manufacturing yield, compensate for imperfections arising from the fabrication and assembly of the display, and transform the fragile large monolithic display into a robust laminate between glass cover plates and back plates.

Robust display glass laminates can be made using adhesive films with a preferred thickness in the range from 25 to 250 $\mu$m, and optimized in compliance. The monolithic display panel can, for example, be laminated between glass cover and back plates without stressing the birefringent AMLCD glass and deforming the LC cell gap. U.S. Pat. No. 5,867,236 "CONSTRUCTION AND SEALING OF TILED FLAT-PANEL DISPLAYS", copending U.S. patent application Ser. No. 09/490,776, U.S. patent application Ser. Nos. 09/368,921 and 09/369,465 show laminate structures which accomplish the desired result. Laminate structures for a prototype 800×600 SVGA 38.6" diagonal tiled display are also shown in copending U.S. patent application Ser. No. 09/368,921. A method for processing large display laminates is discussed in copending U.S. Ser. No. 09/322,047 and U.S. Pat. No. 6,097,455. The laminate is designed with a symmetry about the image creation plane in the AMLCD glass sandwich (LC layer), which contains the weakest link to shear or bending. This link is formed by a narrow adhesive seal, typically about 5 $\mu$m thick, that joins the thin-film-transistor (TFT) substrate to the color-filter (CF) substrate around the perimeter. The width of this seal may be as narrow as 1 mm, or less, and it may be the only mechanical link, other than surface tension of the LC liquid layer, that holds the substrates together during handling, assembly, and field use induced stresses. An external full face seal material, in dry film form, of a preferred thickness range, is used to bond the robust glass cover and back plates on both sides of the AMLCD sandwich to increase the bending strength. This preferred design provides a substantially increased resistance to bending, and thereby decreasing the impact of any unintentional stresses exerted on the narrow seal. The preferred thickness of the adhesive films between cover and back plates and the AMLCD sandwich are dependent on whether or not a mask is used on the back plate to set the light collimation angles. The relationships of these angles are shown in detail in U.S. patent application Ser. No. 09/396,142 and Ser. No. 60/153,962, filed. Sep. 15, 1999, and U.S. patent application Ser. No. 09/322,047, filed May 28, 1999. Since such aperture masks are not needed to keep light rays away from the seams in monolithic displays, the thickness requirement for the adhesive may be relaxed for the monolithic display laminates. Aperture masks may still be desirable in monolithic displays to optimize the acuity and contract of displayed images. Alternatively, they may be removed from the display stack, if other light collimation means are preferred.

The air is controllably purged at the meniscus of the full face adhesive interface between cover and back plates and the AMLCD sandwich so that no bubble type defects are introduced in these laminate structures during the assembly. Techniques for achieving bubble free laminate assemblies, for attaching the compliant adhesive films to monolithic displays, have been described in patent application Ser. No. 60/153,962. Back or cover plates may be made of standard glass, such as Corning 1737 that is commonly used in the AMLCD industry. Today's glass sheet thicknesses have been standardized to 0.5, 0.7 and 1.1 mm. Any of these glass thicknesses may be used in display assembly lamination. Small glass thicknesses allow a smaller radius to be used in an adhesive extrusion process. This translates into a smaller probability for trapping bubble defects. Lamination produces a robust assembly with a continuous refractive index and a well matched thermal expansion compared to the conventional display glass substrates. Although the robustness is improved by increasing the cross-sectional inertia to bending stresses, it is also important to maintain the neutral axis in the LC image plane, in which the epoxy seal joins TFT and CF substrates. This can be accomplished by making the thickness of the adhesive films between the cover and back plates and the AMLCD sandwich equal. For this reason, the laminate is designed to be approximately symmetrical around the LC plane. Consequently, the thickness of both the glass cover and the plates is chosen to lie in the range of 1.1 mm (or greater).

The transparent regions in the sub-pixel compared the total area (aperture ratio) are substantially larger in monolithic AMLCDs (60–80%) compared to tiled FPDs (30–50%) due to the space required by the seam. This has been described in patent application Ser. No. 60/153,072. The viewing angles in monolithic displays are generally not as wide as desired, and the image acuity is highly dependent on the back light, which is normally diffuse. One published method under development for improving the viewing angles is discussed in the following reference (Information Display Magazine Feb. 1999 by Joel Pollock "Sharp Microelectronics' Approach to New-Generation AMLCDs"). Even though in plane switching as discussed in this reference has drawbacks, including slower response times, this technology is gaining favor because there is no other method fully developed to meet the wide view angle requirement for consumer TV applications. This innovation is currently not available in product. As a consequence, there are no AMLCD products with a both good video response and satisfactory view angles for consumer TV application. The inventions disclosed in this patent application, appropriately adapted from tiled displays, will overcome this limitation.

An excellent video response with good view angles has been demonstrated in prototype tiled, SVGA resolution, FPDs with a seamless appearance. The underlying designs have been described in co-pending U.S. patent application Ser. Nos. 09/322,047 and 09/368,921 filed Aug. 16, 1999. The view angle distribution has been achieved by a combination of techniques that include the use of highly collimated light with a sharp cut off angle together with a screen on top of the cover plate. The screen diffuses the highly collimated light rays outward forming the desired viewing angles distribution and therefore provides excellent brightness and hue within a view angle envelope as large as 160–170°.

One drawback to the approach used for tiled displays is that a large fraction of the light is lost in the tight light collimation process. The mask on the supporting back plate and the collimation mechanisms within the light box introduce the largest losses. The screen absorbs or reflects light depending on its material components and refractive index at its interfaces. Despite these effects, improvements in light collection and recirculating technology have made it possible to predict that standard and high definition TV, SDTV and HDTV respectively, 40" display products with a brightness of 300 $cd/m^2$ are possible at power levels of 300 W. Therefore these same techniques may also be applied to monolithic AMLCDs. The brightness-power efficiency in monolithic displays will further be enhanced because of their larger aperture ratios and less severe light collimation requirements. Finally, less light in monolithic displays will be lost in brightness and color matching compared to tiled displays, following from the application of software and electronics based corrections disclosed in patent application Ser. No. 09/396,142 for tiled displays.

Monolithic flat-panel displays made in accordance with known liquid crystal display (LCD) technologies for applications in portable computers (notebook) and desktop monitors are limited in size due to manufacturing yields and cost. This limitation arises partly from the trends towards ever higher resolutions, rather than optimizing the designs and manufacturing or inexpensive, larger, consumer TV displays with diagonal sizes between 20 and 50". Assembly tolerance requirements for tiled displays are stringent and will become more severe with the reducing size of the displays. The practical range of sizes for tiled displays at acceptable resolutions is currently estimated to be at about 30" or larger. Thus the range of interest for application of direct view monolithic AMLCDs to consumer TVs spans from less than 20" to about 30". Monolithic display sizes much beyond 30" are likely to be too expensive for mass productions. At such sizes they will be in direct competition with projection displays, direct view plasma FPDs, and tiled AMLCD FPDS.

In this patent application, flat-panel digital TVs in the 24 to 40" size range with resolutions from SDTV (480 lines) to HDTV (720 to 1080 lines) are chosen as illustrations for the preferred invented design elements.

The desired lighting collimation technology for such displays will be similar to that disclosed in patent application Ser. No. 09/024,481 filed Feb. 17, 1998. However, the cut off angles for the collimation can be substantially relaxed. In contrast, in tiled displays only about 1% of the light is allowed to escape beyond the cut off collimation angles. Therefore, a unique light collimator design optimized for a much higher brightness-power efficiency will be described in this invention for monolithic displays.

The majority of today's liquid-crystal display modules are digitally controlled. An optical transmission-drive voltage relationship (T-V curve) determines luminance of each sub-pixel light valve via the discretized voltage across the pixel, the LC cell in an AMLCD. Color is produced by having the light rays pass through color filter layers placed on top of the sub-pixel apertures. Three separate color filters for the red, blue and green (RGB) primary colors are the most common choice. Additive mixing of the primaries, properly weighed, produces all brightness and hue combinations in the color space. Unless otherwise noted, the T-V curve for each sub-pixel is here considered to be an effective relationship that includes the entire display system response from the electronic drive signal to the resulting luminance.

In large tiled liquid crystal displays, small relative placement variations of the AMLCD tiles with respect to external reference layers, for example, masks on the cover plate, result in changes in brightness and hue of the pixels due to unequal apertures. Aperture displacement may be several percent of a sub-pixel area. As a consequence, a large tiled flat-panel display may have an objectionable checkered appearance, due to color shifts, in spite of all efforts to geometrically hide the actual boundaries of the tile edges with external masks, located for example on the cover and back plates. Pixels near the tile boundaries will inevitably present a different appearance, because their effective T-V curves differ from those in the interior regions. One mechanism responsible for such a difference is the variation of the cell gap towards the edges of the tiles. Another mechanism that often arises originates from the varying response of the liquid crystal material in the sub-pixels near the edge of the tiles. These effects may be corrected for by employing color correction algorithms and corrections to the electronic drive voltages controlling the T-V curves of appropriate sub-pixels. These color correction algorithms and techniques are disclosed in patent application Ser. Nos. 09/396,142, 09/396,105, and 09/396,106.

"Artificial" boundaries similar to actual seams present in tiled displays can be created in monolithic displays by the electronics used to drive the matrix addressed pixel array. Such common optical artifacts can be observed on notebook personal computer displays because of their "dual scan" electronics, in which pixels are scanned in two distinct sets. Large monolithic displays may have to be scanned in four sets (quad scan) in order to guarantee an adequate video response '1. The pixel array is divided into four quadrants and in each the row and column are driven independently using progressive scans. Such a quad-scan arrangement is likely to exhibit optical artifacts at the edges of the scan regions. Other multiple scan arrangements may similarly produce optical artifacts in monolithic displays. Another source of artifacts arises from variations among individual driver chips that cause the drive voltages at neighboring pixels to vary by as much as 10 to 20 mV. Indeed when the voltages, timing, or other elements of such electronic drive circuits do not match precisely, artificial electronic "seams" will generally be created. In AMLCD's visible magnitude of the drive voltage differentials across scan region boundaries can be as small as 5 to 20 mV.

The flat-panel display structures targeted in this invention include monolithic and monolithic-like units in which pixels are addressed in a matrix fashion but accessed from two edges, a single edge, or more than two edges of the array. While two-edge accessing is most common, other alternatives may be preferable for specific applications. Generally these different access configurations give rise to interconnect lines with a different length and cross-over count depending on the location of the pixel within the array. These differences alter the electrical characteristics of the pixels, for example through the most significant impact is on the kick-down effect that changes the LC cell voltage after charging from the column line via the local coupling capacitance between the cell and the row line. Both the cross over capacitance between the row and column lines and the gate-to-drain capacitance of the TFT contribute to this coupling. Depending on the design this kick-down voltage may be as large as 2 V, i.e., a significant fraction of the column voltages range. It is possible correct for the kick-down voltage by adjusting the pixel drive signals, if this effect is uniform over the array. If the kick-down voltage varies as a function of pixel location, for example because of array accessing, these corrections will become much more difficult. Techniques that work for such conditions will be described in this invention.

SUMMARY OF THE INVENTION

In accordance with the present invention, there are provided techniques for designing large, robust monolithic and monolithic-like displays having good brightness and contrast over a wide range of viewing angles. These techniques include controlling the layout of the pixel array and its access circuits that modify the electrical characteristics in order to minimize undesirable optical, electro-optical, and ambient light aberrations and any electronic anomalies creating visually perceptible discontinuities or boundaries. These artifacts are reduced to levels that allow for better color correction. In addition, the use of optical components such as collimators, light enhancing films, diffusers, screens, polarizers and masks are described. The resulting displays present luminance and chromaticity outputs from areas of originally varying optical response that become uniform within the tolerances of the human visual system.

It is, therefore, an object of this invention to provide compensating means for correcting for the effects in duced by any other optical, electro-optical, mechanical, or structure related anomalies in large monolithic or monolithic-like LC displays. These include, for example, the variations in the cell gap, which is determined by the size and placement distribution of spacer balls or fiber and by stresses generated within the assembly. Chromaticity and luminance variations at the boundaries will either be corrected or smoothed over a predetermined width, so that residual variations are thus suppressed and boundaries or seams will become visually imperceptible.

It is another object of this invention to correct for optical aberrations caused by artificial boundaries (seams) due to partition in the electronic circuits, including those for generating or transmitting pixel scans, light valve controls, and pixel drive signals, whether occurring on monolithic monolithic-like , or tile displays.

The final object of this invention is the electronic correction of the brightness of all pixels across the interior of the pixel array, whether tiled or monolithic, so that the display presents a visually uniform luminance and chromaticity to the viewer. Such corrections are made for each display assembly and are unique to that display.

BRIEF DESCRIPTION OF THE DRAWINGS

A complete understanding of the present invention may be obtained by reference to the accompanying drawings, when considered in conjunction with the subsequent detailed description, in which:

FIG. 3 is a plan view of three embodiments of light collimating lattice geometries: (a), (b) and (c) for square, triangular, and hexagonal geometry, respectively;

For purposes of both clarity and brevity, like elements and components will bear the same designations and numbering throughout the FIGURES.

DETAILED DESCRIPTION OF THE PREFERRED EMBODIMENT

The present invention pertains to the manufacturing and assembly of large monolithic, monolithic-like, or tiled AMLCD flat-panel displays with diagonal sizes from about 20" to 40", and more specifically to: hardware structures; assembly designs; optical enhancements; control, drive and correction electronics; and back light systems that facilitate wide view angles in consumer electronic SDTV or HDTV applications. The present invention also describes corrective means for brightness and color discontinuities and their topographical variations that are objectionable to the viewer and that require special optical designs and the ability to correct the display with unique algorithms and control electronics.

Figure 1:
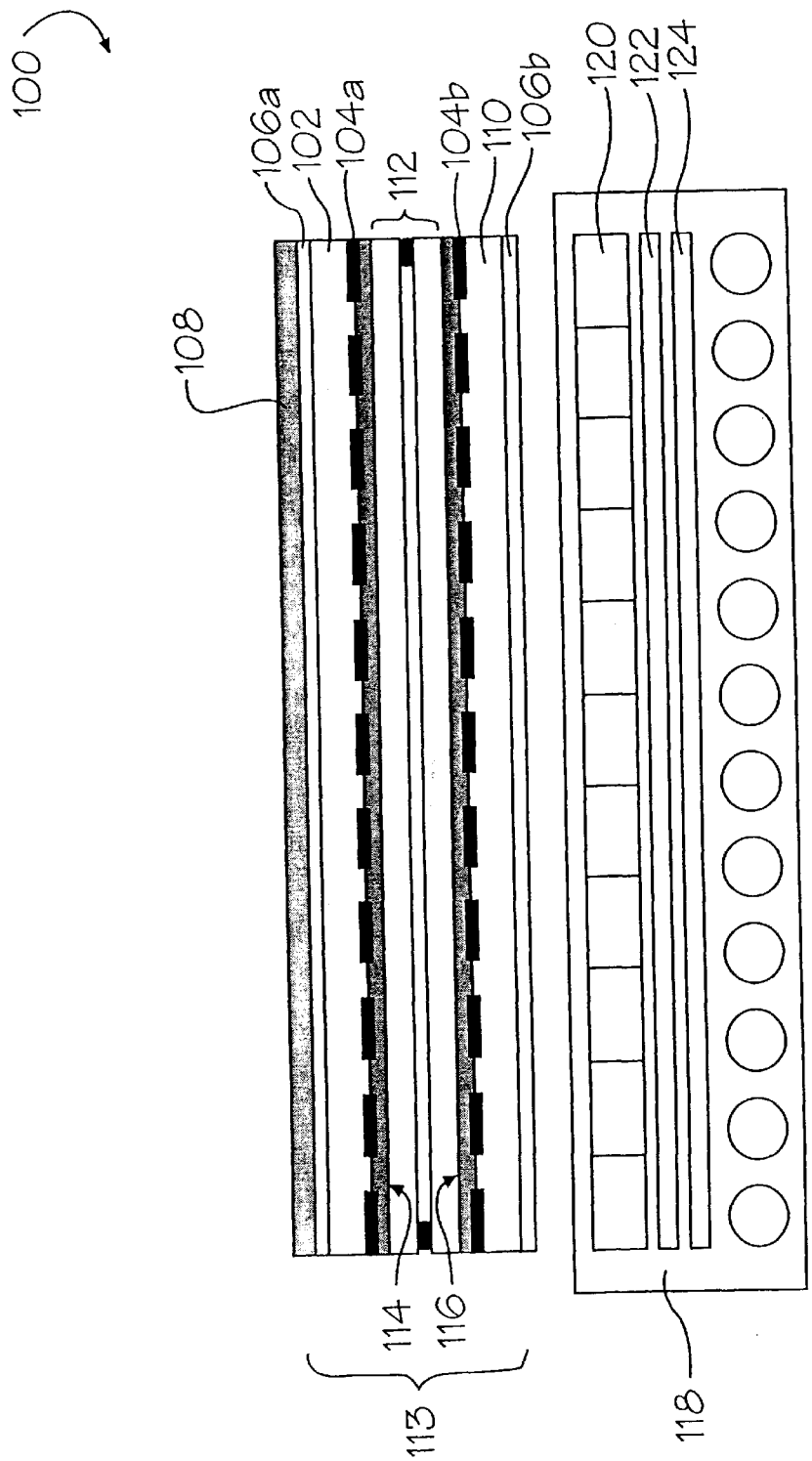
FIG. 1 displays a cross-sectional schematic view of a portion of a large, monolithic, AMLCD, flat-panel display with a robust structure, optical enhancements, and lighting means for consumer applications.

A cross section of the embodiment of an assembled robust laminated large monolithic AMLCD is shown in FIG. 1. The cover plate 102 contains a mask 104a on one side and a polarizer 106a on the opposite side. A screen 108 is adhesively bonded to the polarizer 106a. A back plate 110 contains a second mask 104b on one side and a polarizer 106b on the opposite side. The display 100 is sandwiched between the cover plate 102 and the back plate 110 and is adhesively bonded over the full face with compliant polymer films, 114 and 116, respectively. The light box 118 also contains a light collimating mechanism 120, a light enhancing film 122, and a light diffuser 124. A specific light box and light collimation mechanism are described in copending U.S. patent application Ser. No. 09/407,619, now issued as U.S. Pat. No. 6,447,146; Ser. No. 09/406,977, now issued as U.S. Pat. No. 6,417,832; and Ser. No. 09/407,620, now issued as U.S. Pat. No. 6,341,879, all filed Sep. 28, 1999, and Ser. No. 09/024,481, filed Feb. 17, 1997, now issued as U.S. Pat. No. 6,152,580, all herein included by reference.

Figure 2:
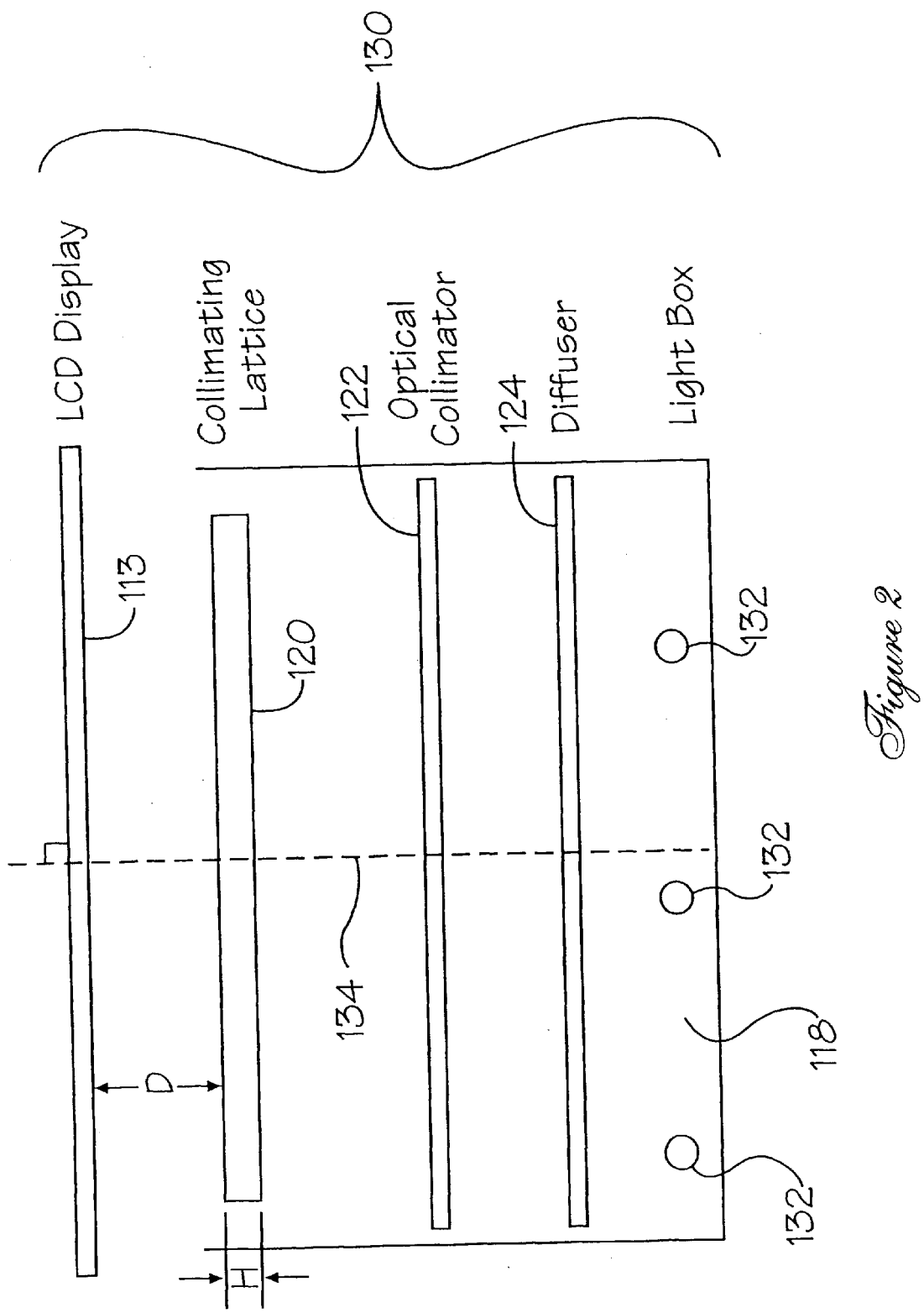
FIG. 2 shows a cross-sectional schematic view of the preferred embodiment of the light collimating illumination source with the associated monolithic, flat-panel display assembly superimposed on the top.

Referring now to FIG. 2, a cross-sectional view of a monolithic flat-panel display assembly is shown, generally at reference numeral 130. This assembly also contains the inventive collimating lattice 120. The assembly 130 utilizes a conventional light box 118 in conjunction with the collimating lattice 120 and the robust laminated structure 113 (FIG. 1). A conventional light source for an LCD display normally consists of the following four elements: a light box 118 housing with one or more fluorescent lamps 132, a diffuser sheet 120, and an optical collimator (brightness enhancing film) 122 and a reflecting cavity (not shown). A fifth element is added to the light source in this invention: a unique collimating lattice 120. It has a depth H and placed at the distance D from the LCD display 113. The light collimating lattice 120 is used to efficiently produce the collimated light that is needed in order to generate a sharp image at wide view angles on the large flat-panel display. The significance of H and D and choices for their values will be discussed in detail hereinbelow.

Referring now to FIG. 3, plan views of three geometric shapes of light collimating lattice assemblies are shown. These are desirable embodiments of the method described in the current invention. The upper, middle and lower sections of FIG. 3 show a lattice of square cells 136, triangular cells 140, and hexagonal or honeycomb cells 150, respectively. The lattice cells 136, 140, and 150, can be characterized by their typical width W of about 3–5 mm, 132, 142, and 152, respectively. The lattices 136, 140, 150, may be constructed from any material that is thin compared to the size of the pixel. Such materials include plastic, paper, aluminum, or other metals. The interior surfaces of the cells in the lattice may be plated, dyed, painted, or treated in any other way to produce surfaces with a uniform but low specular and diffuse reflectivity for all wavelengths contained in the visible spectrum of light originating from the light source. Instead of a specific surface treatment, the material itself can be non-reflective. The thickness of the cell wall in the lattice, that is now shown in FIG. 3, should be minimized to permit as much light as possible to pass through the lattice 136, 140, 150. In the preferred embodiment, a commercially available aluminum honeycomb lattice is spray or dip painted with the preferred paint.

Figure 4:
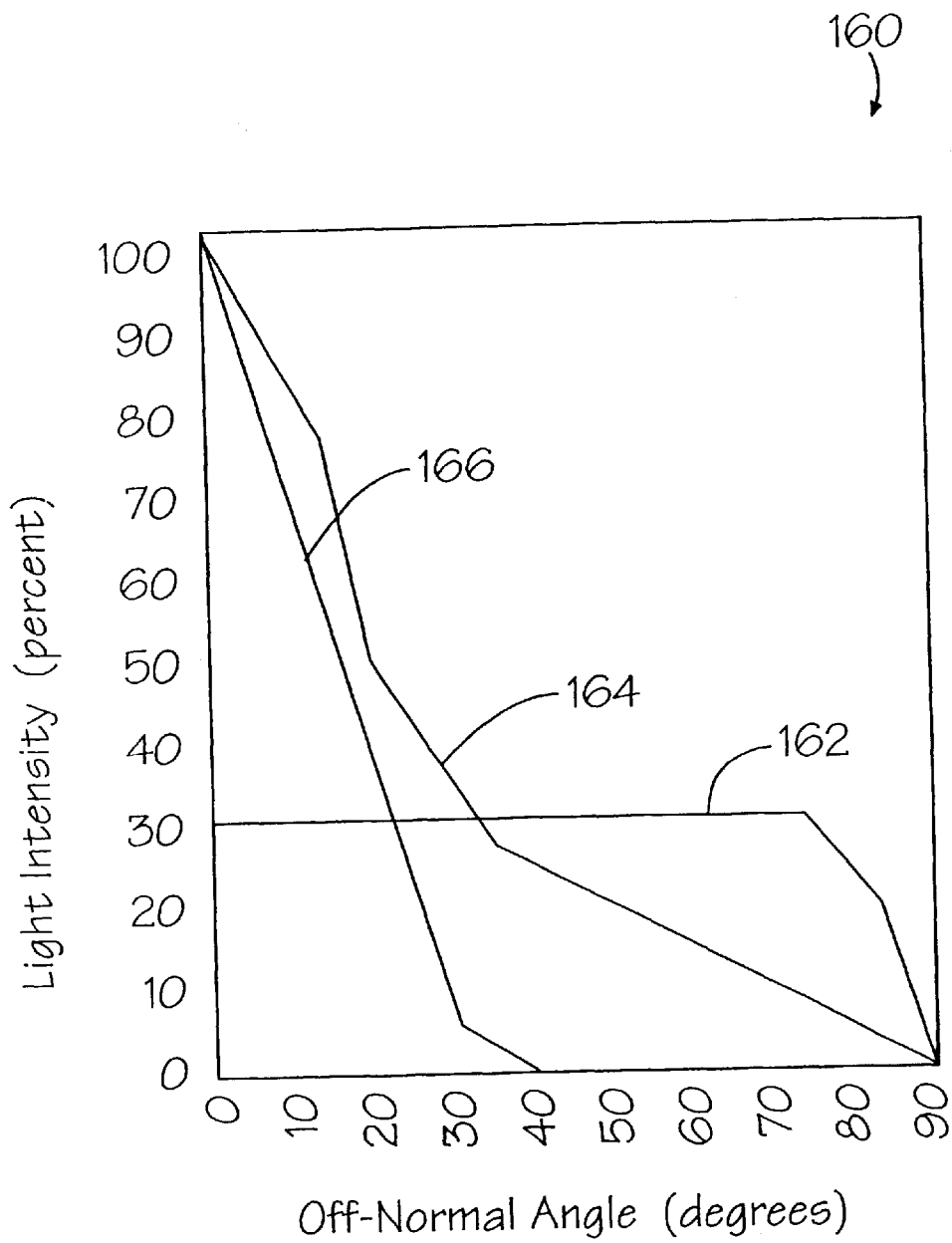
FIG. 4 is a diagram showing the light collimating characteristics, relative light intensity as a function of the off-normal angle, for various light collimating elements: lattice collimator, an optical collimator, and a diffuser being shown.

Referring now to FIG. 4 there is shown a graph 160 of the relative collimating efficiencies of various light collimating elements of the light source shown in FIG. 2: diffuser 124, optical collimator, 122, and lattice collimator 120. Referring again to FIG. 2 an ideal diffuser 124 disperses the light from the lamps 132 forward in all directions, at a uniform brightness. Light intensity should be constant at all angles measured with respect to line 134 normal to the front or rear surface planes of the diffuser 124. Light of this nature is referred to as Lambertian. The light from the lamps 132 first passes through diffuser 124 and then passes through optical collimators or brightness enhancing film 122. These readily available devices are usually constructed of prismatic arrays micro-geometry which change the Lambertian-like light distribution from a typical diffuser to a more forward directed distribution, producing the light intensity versus off-normal angle curves 162, and 164 respectively. This is achieved through refraction and recirculation of light. The light energy at angles above the desired cut-off angle (i.e. that which remains when only the diffuser 124 and optical collimator 122 are used) may be too high for use with the inventive monolithic-like flat-panel display having a wide view angle and visually sharp appearance. The addition of the collimating lattice 120 in accordance with the invention removes light in a desired angular distribution as shown in curve 166 in FIG. 4. This produces the desired sharp appearance of the display with wide view angles. Contrast, brightness and the degree of collimation involve a trade-off that impacts the light-power efficiency of the display.

Figure 5:
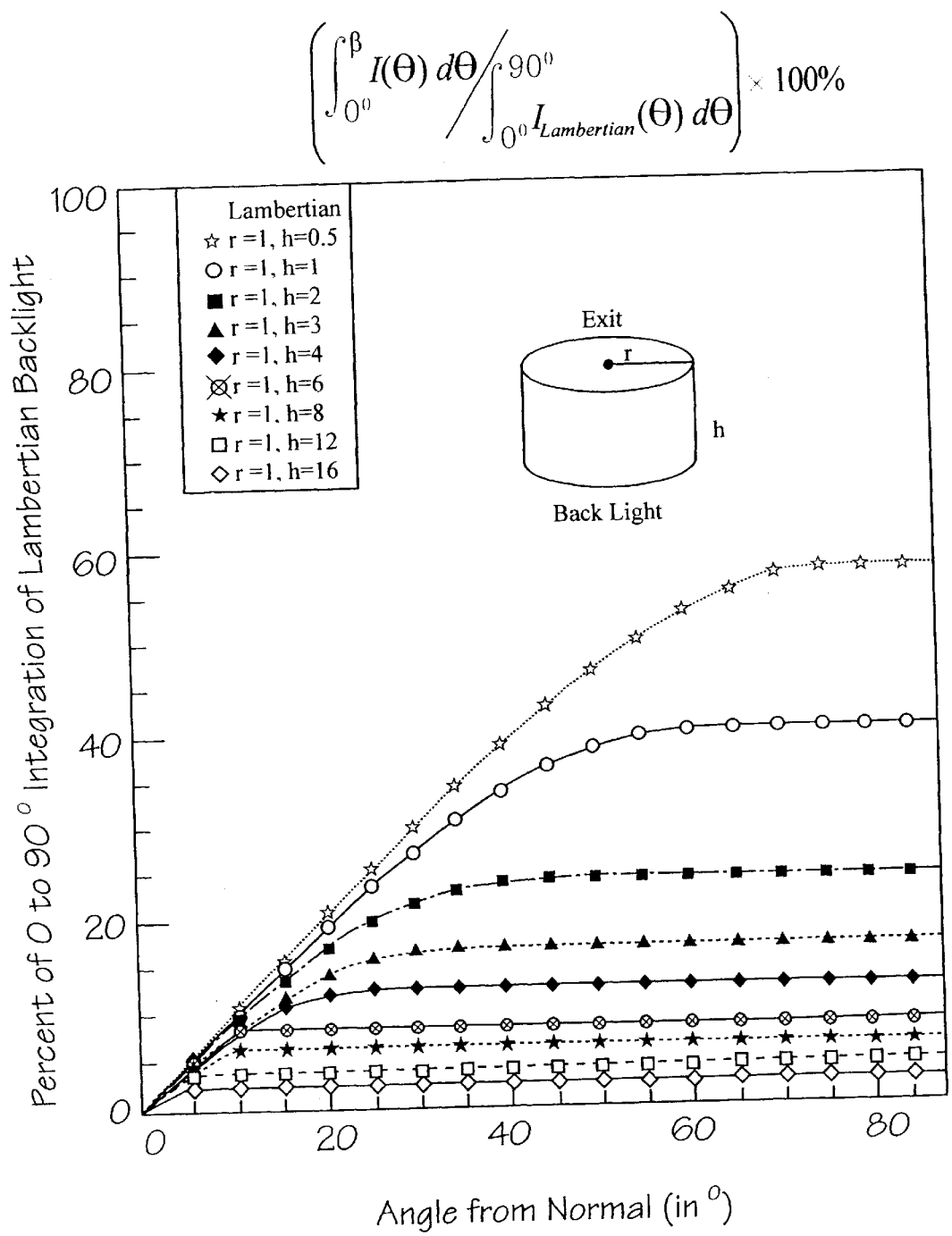
FIG. 5 shows the calculated light transmission efficiency as a function of the off-normal angle for light collimation by a cylindrical lattice with a varying angular efficiency resulting from absorbing lattice surfaces with various height to radius ratios, the insert showing the lattice cell geometry and its geometrical parameter values.
Figure 6:
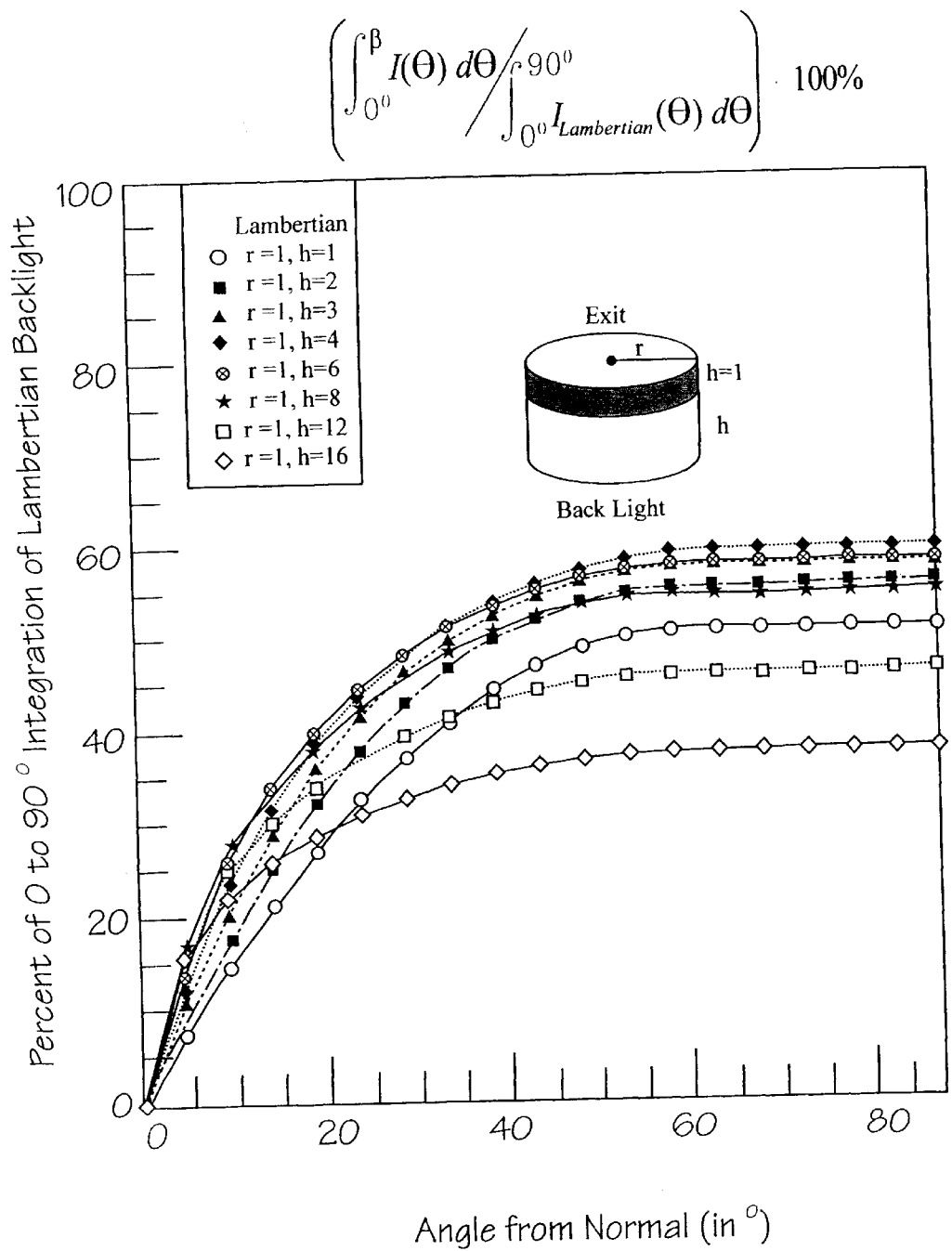
FIG. 6 shows the calculated angular light transmission efficiency as a function of the off-normal angle for a variety of lattice collimator designs of interest to large monolithic-like displays, the insert showing the lattice cell geometry and its geometrical parameter values.

A problem arises from the use of a lattice collimator that is treated to produce a surface with uniformly minimal specular and diffuse reflectivity, as discussed above. As consequence a substantial fraction of light may be lost depending on the magnitude of the height to cell diameter ratio H/D of the lattice. This is illustrated in FIG. 5. An improved lattice collimator with a substantially increased light can be achieved by treating the internal cell internal surfaces in the lower section (closer to the light source) with a highly specular reflective material, while keeping the low specular and diffuse reflectivities in the upper section. The angular intensity factors are shown in FIG. 6 for a variety of light collimator lattice designs varying the reflective and non-reflective sections of the lattice cell walls. For use with the inventive monolithic-like AMLCD FPD with wide view angles, a preferred light collimation design may be chosen that balances light intensity with good visual image acuity or sharpness at desired view angles. The inventive designs project more light forward by virtue of the reflective portion of the lattice cells, but can also achieve desired sharply cut-off angular distribution for application in tiled FPD's, in which wide angle light rays should be kept away from seams. A highly efficient light recirculation mechanism within the light box is preferable for this collimation technique.

Figure 7:
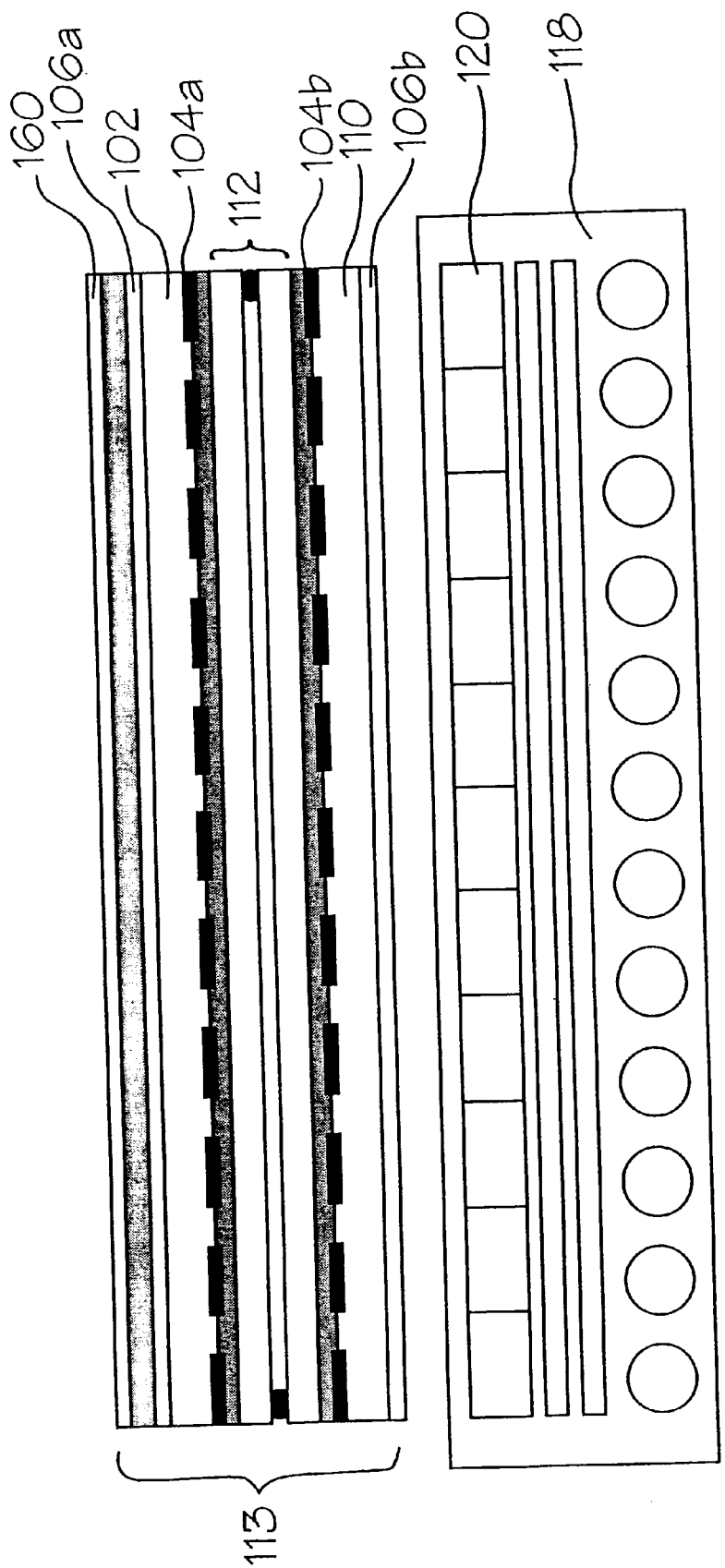
FIG. 7 illustrates a cross-sectional schematic view of an alternative embodiment of a large monolithic-like AMLCD in contrast to the design shown in FIG. 1.

An alternative effective optical stack is shown in FIG. 7. In this case a third polarizer 160 has been inserted on the viewer's side of the screen 108 in order to adjust and counteract the ambient light passed into the optical stack from the outside and being reflected back from various interfaces within the optical stack. This undesirable reflective light would otherwise reach the viewer superimposed on the displayed image and therefore degrade the image modulation and contrast.

The mask 104b (FIG. 1) on the back plate 110 (FIG. 1)is not employed in the design shown in FIG. 7, because light collimation has been optimized tailoring the lattice light collimation mechanism 120 placed within the light box 118. However the mask 104a on the cover plate 102 has been kept in order to provide a desirable visual image acuity and an improvement in contrast in the view plane. An additional embodiment, not shown in FIG. 7, is identical to this design except that it has no masks (104a, 104b) on either plate (102, 110). If masks are used on the cover plate, a slight misregistration of the pixels with respect to the mask 104a will cause color shifts in a tiled display due to the slight variations in the position of sub-pixel and mask apertures. Such color shifts will be smaller in the image view plane of a monolithic AMLCD's, but any small angular variations in lighting in the assembly cross section may still produce visually disturbing artifacts.

FIGS. 1 and 7 also feature a light box 118 that provides the assembled FPD laminate structure 113 with a desired uniform distribution of light and light collimating angles, both of which can be optimized for the chosen pixel size and optical stack height. In a monolithic design, in contrast to a tiled one, the dark space between pixels will generally be much smaller. Therefore if a mask is used, the mask stripe dimensions can be chosen to be very small. Consequently the mask will have only a minimum impact on the light-power efficiency. Furthermore, light collimating angles in the back light can be designed to optimize the visual acuity, brightness, and contrast for wide view angles using a screen 108 that is chosen for a monolithic display without physical seams.

Figure 8:
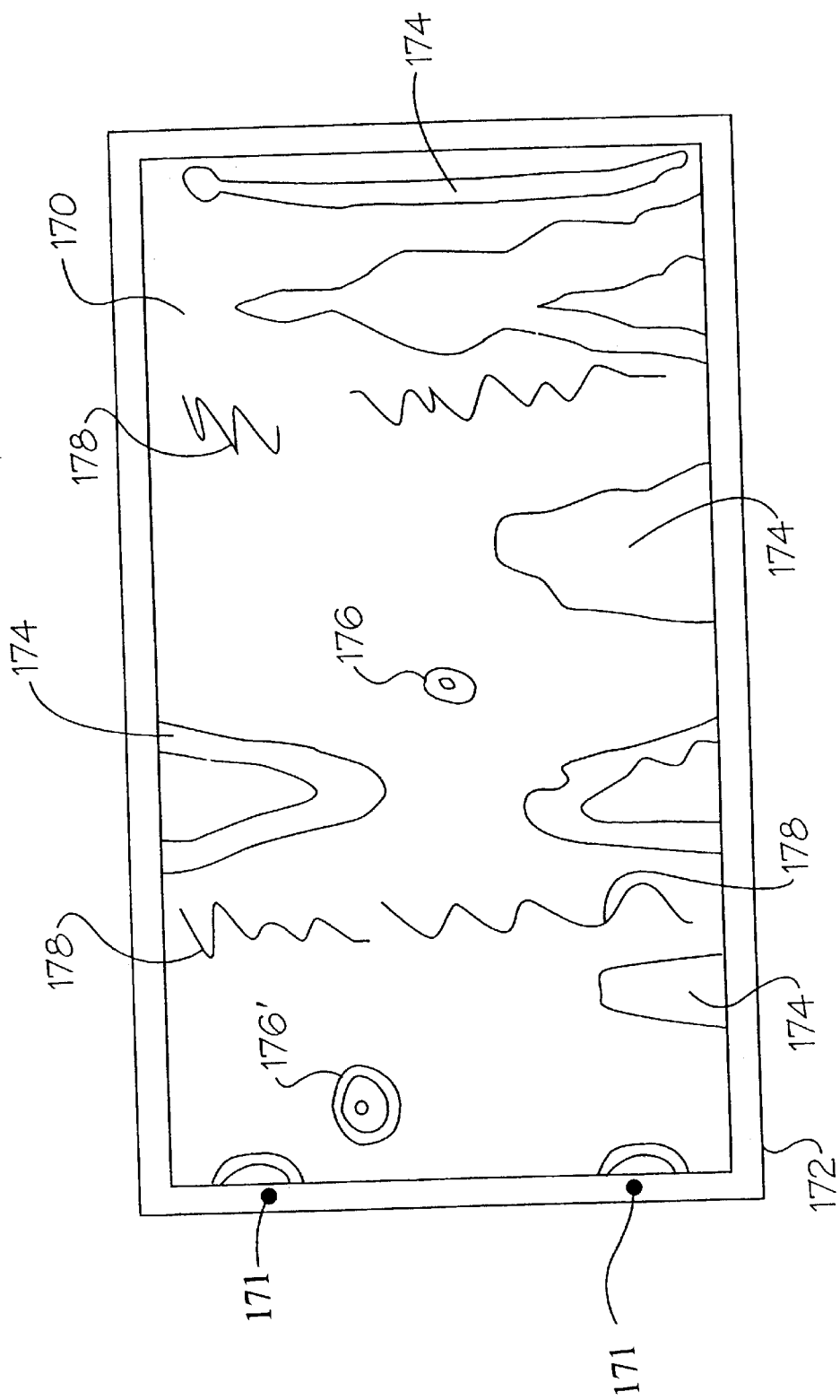
FIG. 8 presents a topographical map of typical color shifts and color graduation variations resulting from a variety of mechanisms in a large monolithic-like, AMLCD, flat-panel display assembly.

There are other mechanisms other than physical or electronic seams that may degrade the image. This is illustrated in FIG. 8. One of them is local stress that can change the cell gap. Stress variations are likely to occur near the perimeter of the display, where panel 170 is attached to the frame 172. Another potential location is near an imposed stress or deformation induced by a fastener, such as a screw 171. If the cell gap is decreased in any area that area will display a blue gray color tint. Alternatively if the cell gap is increased over a surrounding area that area becomes brownish in color. For this reason the polymer films encasing and sandwiching the monolithic AMLCD panel should have a very low elastic modulus, preferably in the range of 1,000 PSI, be thick and fludic enough during the encasing process, so that the display panel 112 can uniformly relax to a low stress level. This encasing process and design of the cross section allows the as manufactured AMLCD panels to carry a small bend or warp or have a slightly out-of-flat surface. Flatness and the stress issues at the seal generally increase with the size of the display panel. Therefore increasing the robustness of the cross section of the laminate with cover and back plates is essential for large monolithic AMLCD FPDs in order to stabilize their mechanical cross section and especially the cell gap. The residual impact of stresses in the constrained areas of the AMLCD laminate can be corrected by the methods disclosed in RDI-118 and our copending U.S. patent application Ser. No. 08/649,240 filed May 14, 1996, if they cause small residual brightness or hue shifts. The non-uniform cell gap locally alters the color space formed by the set of all possible tristimulus values. A uniform gray scale response for all primaries and their luminance levels is the preferred goal.

Furthermore, if all dark space areas in the pixel array are designed to match the thickest color filter layer, the same material and thickness should be used in the perimeter outside the pixel array in order to precisely control the cell gap in an AMLCD. This combination of a single thickest color filter layer together with the diameter distribution of spacer balls or fibers determines the cell gap and the cell gap uniformity. This design determines that the thin-film-transistor (TFT) and the color filter (CF) substrates will be substantially parallel to each other, thus determining a substantially uniform cell gap over the entire pixel array of the display. In contrast a design which does not incorporate a single color filter cell gap control inside and outside of the pixel array allows the lamination process to compress the plates non-uniformly and therefore require substantially more color correction.

Also illustrated in FIG. 8 is a stress effect induced by combination of the polarizer and cover plate glass. This may cause visible optical birefringence effects 174, when the AMLCD is operated in the dark state. Large streaky white areas superimposed on the desired image and spread over broad regions of the FPD are the visual impact on this effect. These large area effects are caused by the non-uniform stresses in the glass that are thought to arise from the directionality of the cooling, when the glass sheet is manufactured. These stresses will be optically enhanced, when the polarizer is attached. The brightness variations of these regions areas can be corrected and smoothed using the software and electronics.

Still another effect demonstrated in FIG. 8 is the effect of spacer balls clustering 176 on light transmission. This type of defect increases with the panel size and with decreasing panel glass thickness. The layout design of the cell is also impacted by this effect. The flexibility of the large glass sheets and ability of the liquid crystal material to flow across a large monolithic panel allows the spacers to relocate and collect into clusters during manufacturing as well as in field use. The thick cover and back plates decrease the flexibility by approximately a factor of 8 with the lamination of thicker cover and back plates into the assembly (e.g., 1.1 mm thickness). As described above, this invention covers a cell design with a single thickest color filter in all dark space areas to make the TFT and CF glass plates parallel. The spacer balls are then only free to move within the aperture of a sub-pixel, which greatly minimizes clustering spacer ball or fiber clustering despite the larger pixel pitch. The spacer balls in the color filter area will be pinned down by the stiff laminate assembly and thus unable to migrate into clusters.

Finally shown in FIG. 8 are seam like boundaries 178 that arise from the impact of small electronic variations on brightness and hue over the pixel array. A variety of mechanisms can cause electronic discontinuities over large monolithic AMLCD panels. The most probable of these to be visible are brightness and hue shifts at the boundary 178 between two pixel array regions driven by different row or column driver chips. Therefore either a column driver boundary (usually vertical) or a row driver boundary (usually horizontal) within the pixel array may appear. Brightness and hue differences, especially if they appear in a recognizable static pattern, can be induced by data voltage differences as small as 5–10 mV. Larger pixel drive voltage differences arising from dynamic charge effects on row and column lines will be tolerable, if the displayed images change rapidly.

Figure 9:
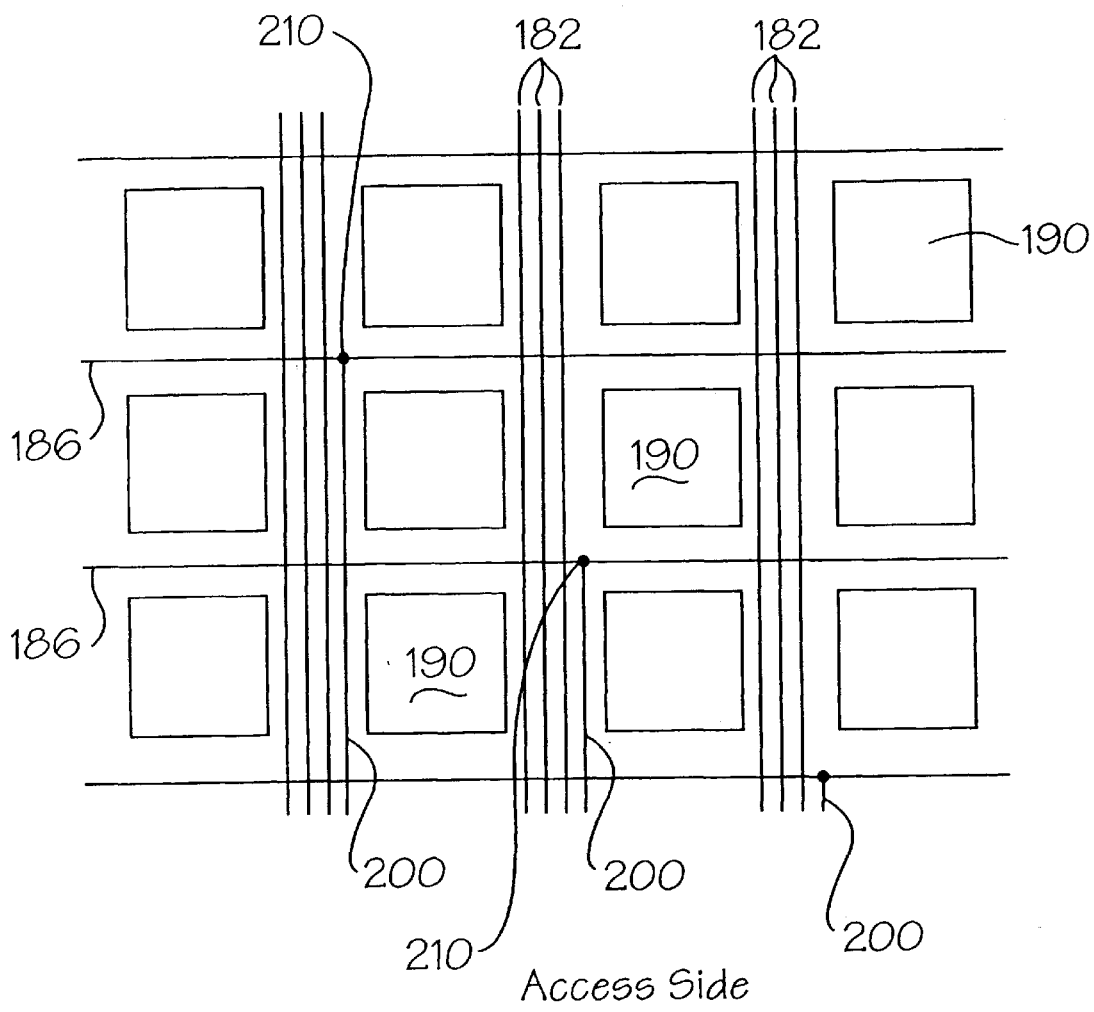
FIG. 9 illustrates access wiring from two edges of the matrix addressed pixel array in a monolithic AMLCD, column lines being accessed from the top and row lines from the bottom using special row access lines.
Figure 10A:
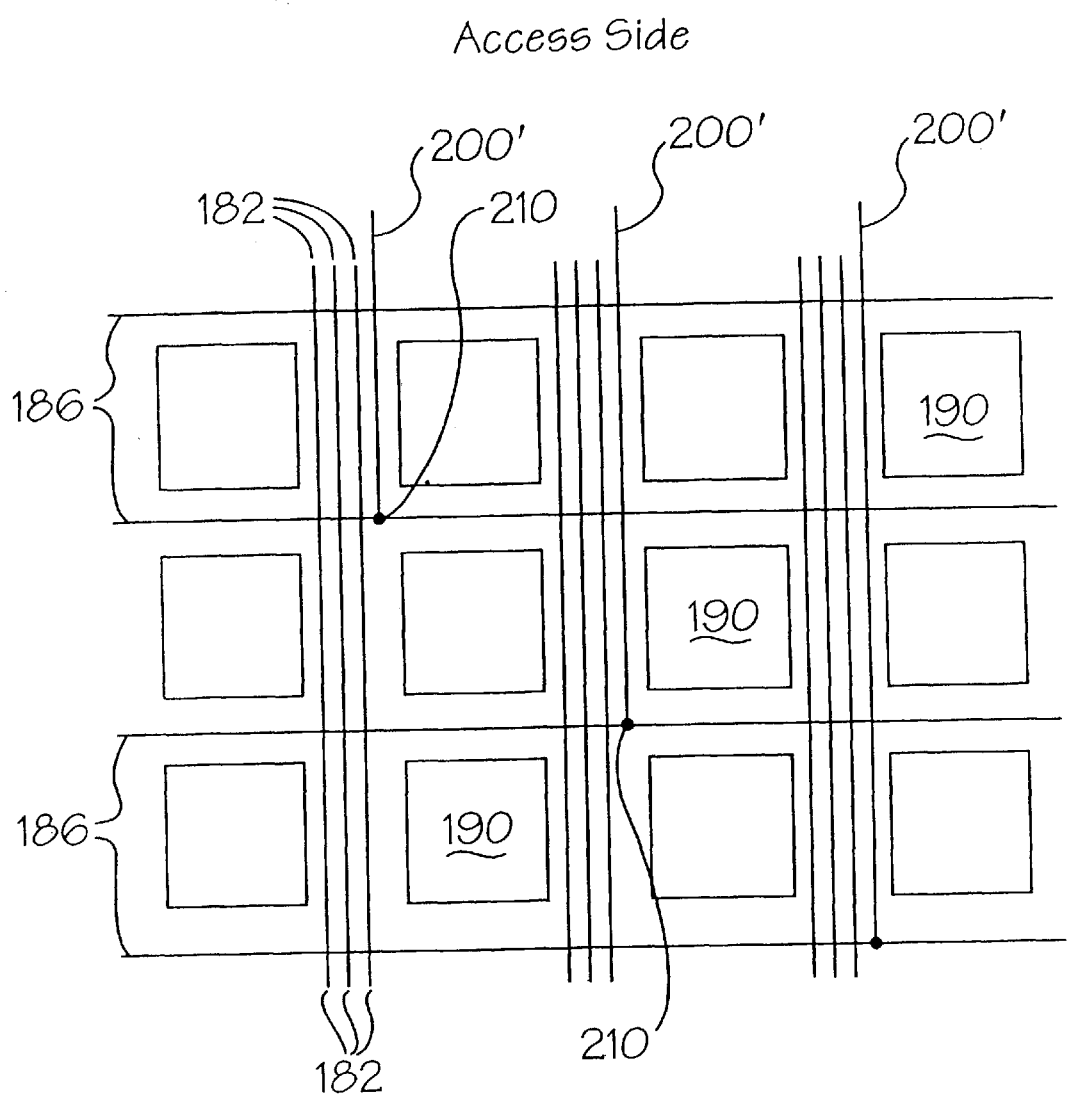
FIGS. 10a and 10b illustrate pixel array access wiring from a single edge of the matrix addressed pixel array in a monolithic AMLCD, FIG. 10a showing continuous column lines with row access lines connected at tap points to row lines, and FIG. 10b showing continuous row lines and continuous common lines with column access lines connected at tap points to column lines.
Figure 10B:
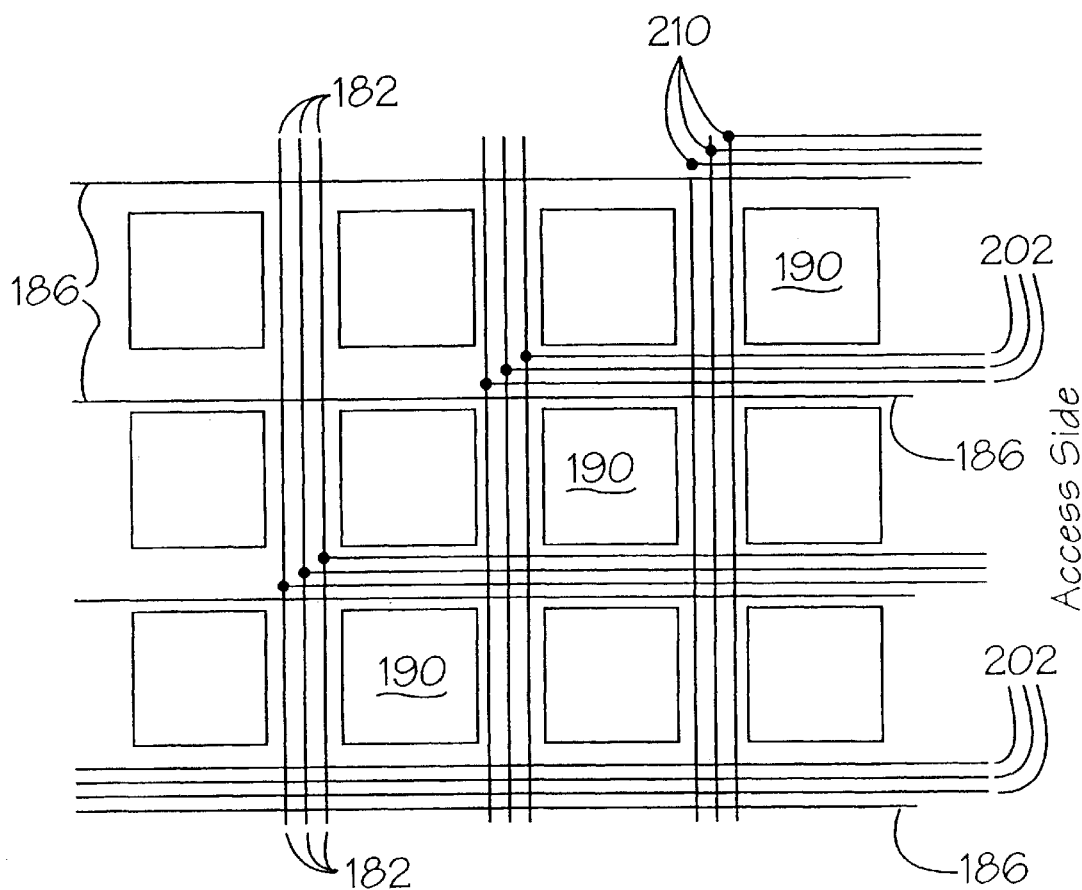
Figure 11:
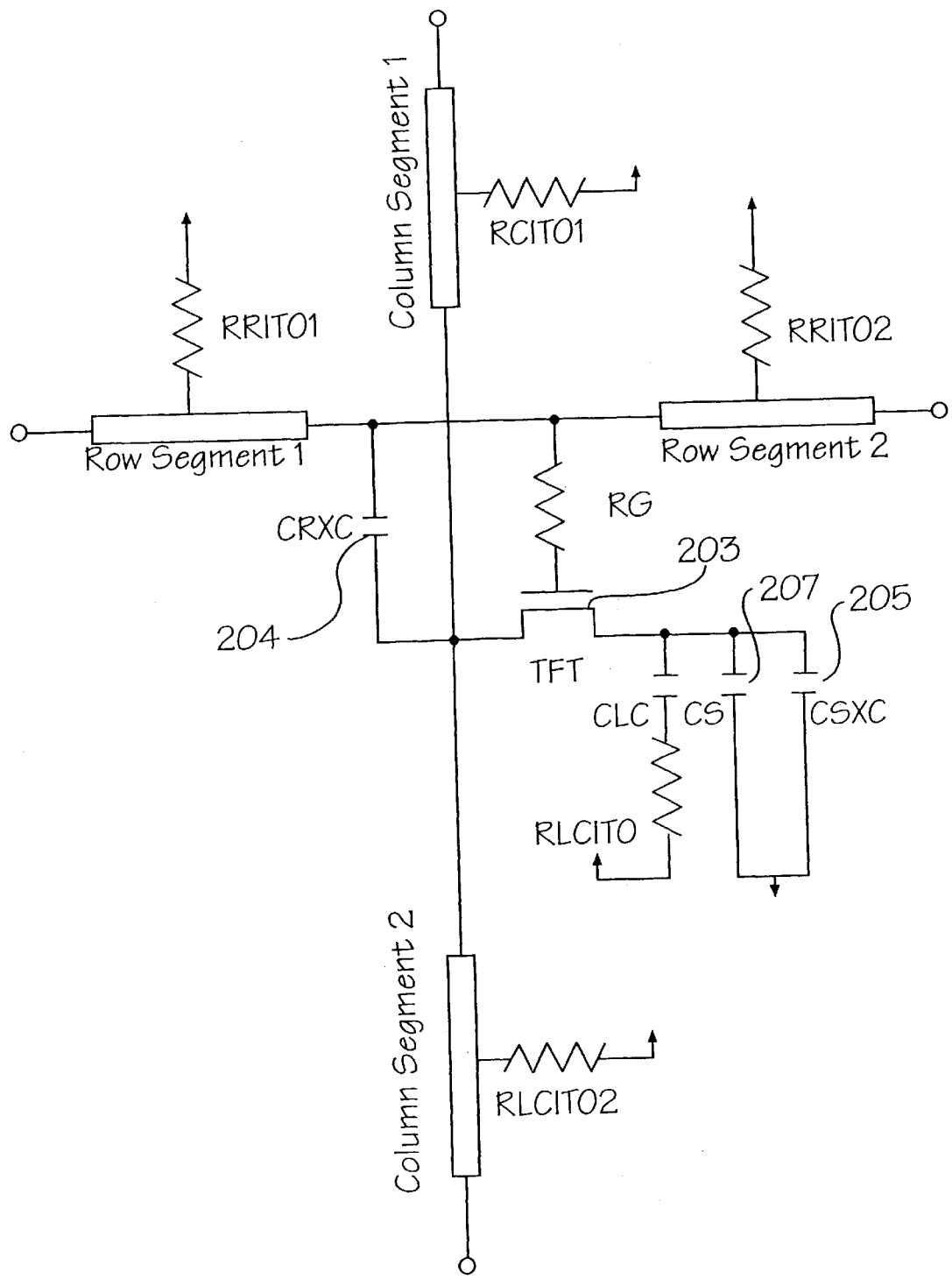
FIG. 11 shows an equivalent circuit model for a liquid crystal cell within a sub-pixel for a typical AMLCD.

Display designs that access the matrix addressed pixel from opposite edges of the array as shown in FIG. 9, or with access from a single edge, as diagramed in FIG. 10 will show electronic artifacts in particularly disturbing ways. Since the interconnect layout and distances from the driver chips to individual pixels vary much more than in conventional matrix addressed displays with array access from two adjacent edges, pixel drive signal delays and waveforms may vary significantly from pixel to pixel. Row pulse variations have less impact on pixels because row lines generally select pixels rather than provide the data that sets the light valve to one of its discrete levels, usually to a precision of 8 bits or 256 levels. Column pulse levels must be controlled to the precision of the least significant bit in the given timing window. For example for 8 bit operation with a maximum data value of 5 V, the least significant bit is about 20 mV for uniformly spaced levels. However, because of the capacitive coupling between row and column lines at row and column overlaps and through any active devices, such as TFT's used to select and write control voltages into the LC color valves, pixel data voltage waveforms are affected by local capacitances within each pixel and distributed global capacitances in the column and row circuits (FIG. 11). One of the most significant capacitive coupling effects produces the so-called data voltage "kick-back" or "kick-down" effect. It reduces the voltage stored into the cell that will be stored for the entire frame time until the next data voltage is written. The magnitude of the kick-down voltage is determined by the design of the display, and it may in a typical AMLCD be as large as 2 V. If these capacitive coupling effects on LC cell voltages are substantially uniform over the entire pixel array, they can easily be compensated for by adjusting data voltages, common voltages, or reference voltages that are used by the digital-to-analog (D/A) converters to produce the actual row column voltage waveforms. However, generally in large FPD's, and especially in large FPD's with unconventional array access, e.g. opposite or single side access, the global distributed capacitance may vary significantly even if local intra-cell capacitances are uniform. Therefore, the resulting pixel drive voltage levels and waveforms will produce luminance and chromaticity over the pixel array. If such variations would occur smoothly over many pixel pitches they will not be as readily visible as in cases where adjacent pixels are affected or patterns emerge. Because of the regular layout of row and column lines, and any access lines from driver chips to row and column lines present regular patterns, most unconventional array access configurations are likely to produce visible patterns in the brightness and the hue of the display that are objectionable to the viewer.

Figure 12:
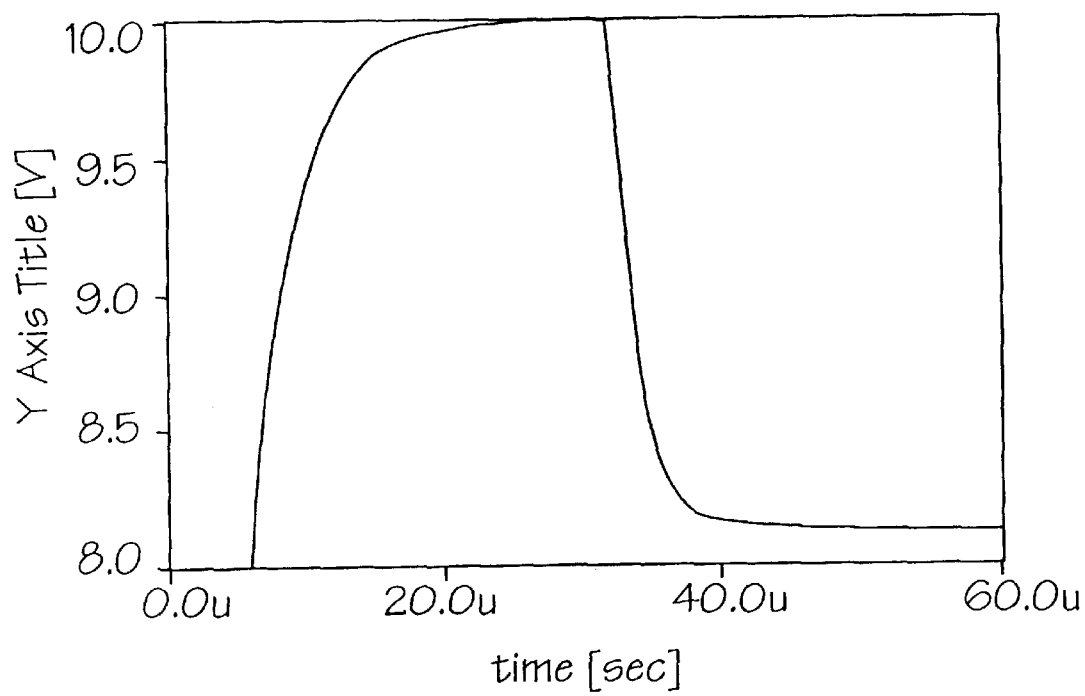
FIG. 12 shows the result of a simulation of the kick-down voltage effect in the liquid crystal cell after the turn-off of the TFT due to coupling capacitance between the cell row and column lines in a typical AMLCD with a 1 mm pixel pitch.
Figure 13A:
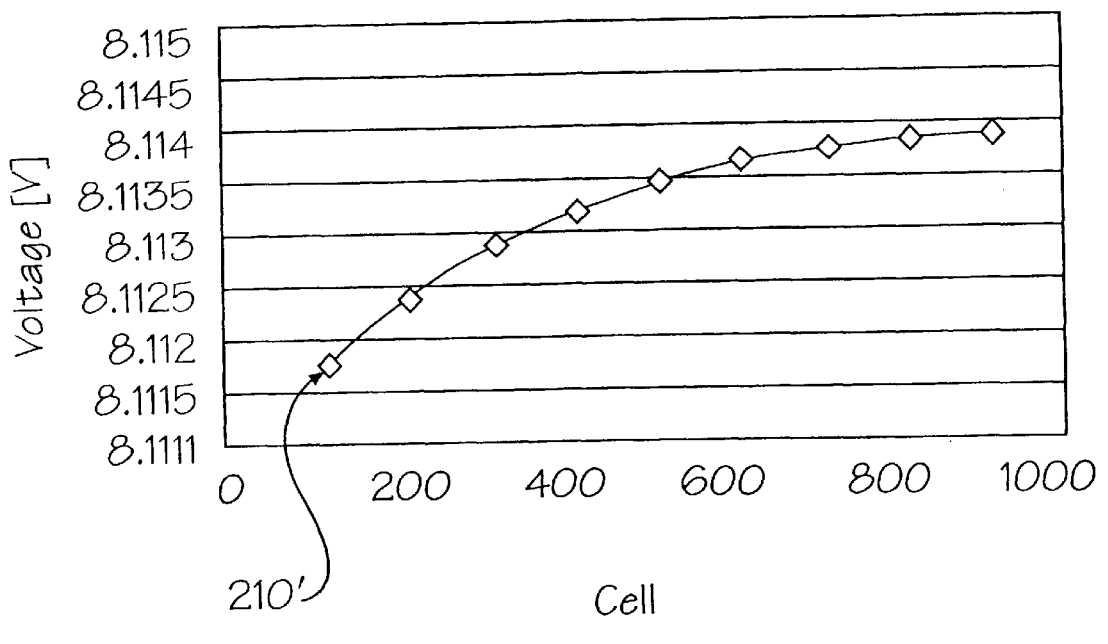
FIG. 13a shows the simulated data voltage for pixels subject to a given excitation level after the voltage kick-down effect as a function of the distance from the driver circuit connected to one edge of the row line.
Figure 13B:
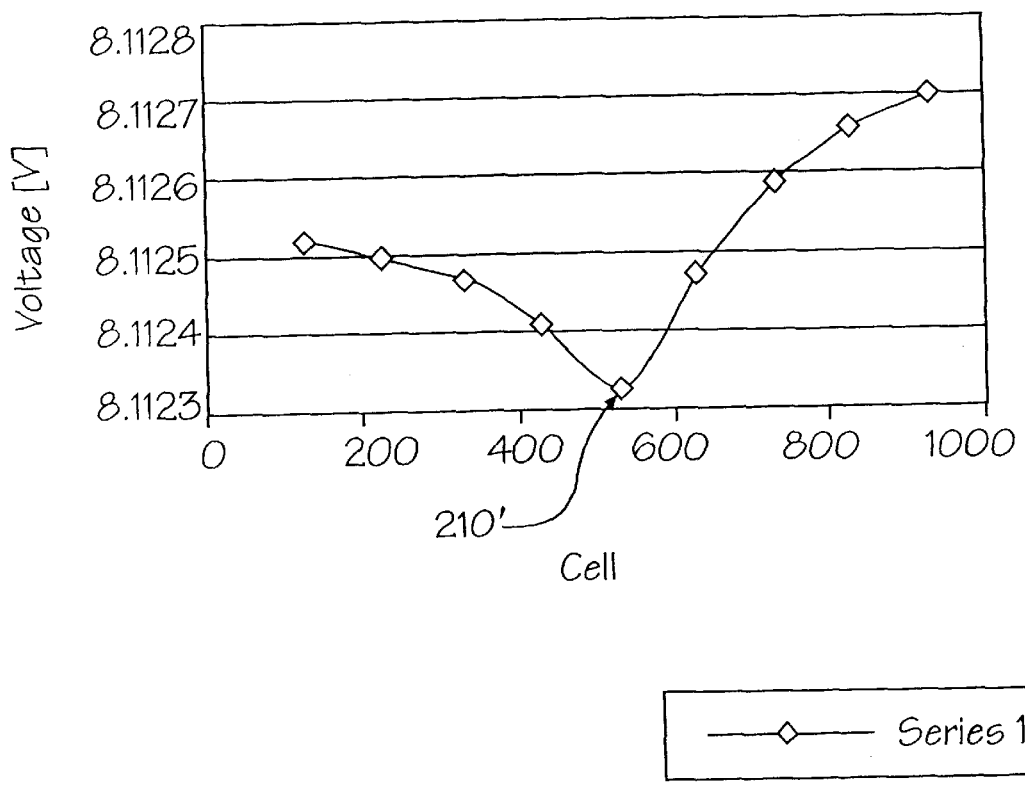
FIG. 13b shows the simulated data voltage for pixels subject to a given excitation level after the kick-down effect as a function of the location of the pixel with respect to the row line tap point located in the middle of the row line.

Techniques for correcting such patterns in large monolithic, monolithic-type, and tiled displays will next be described. The kick-down voltage in an AMLCD is used as the illustrative example. To first order the kick-down voltage is determined by the ratio of the coupling capacitance and the cell capacitance and multiplied by the magnitude of the voltage swing between the row and column lines, all of which are quantities local to the pixel in question (FIG. 12). To second order the kick-down voltage also depends on the impedance of the row and column drive circuits as seen by the pixel in question. This impedance is dominated by the distributed capacitance of the row and column lines. Capacitances arise from metal interconnect interactions with other metal interconnect lines on the same or different level, all of which are located on the TFT substrate, or from interactions with the conductive but transparent indium-tin-oxide (ITO) electrodes, one of which is located on the TFT substrate and the other on the CF substrate. Generally the magnitude of the kick-down voltage of an LC cell increases with the distance of said pixel from the row and column driver chips in a conventional matrix addressed AMLCD with access from two orthogonal edges (FIG. 13a). For unconventional access configurations, e.g. single edge access, the magnitude of the kick-down voltage also depends on the distance of the pixel from the row or column tap point (FIG. 13b). Generally the kick-down voltage is largest in LC cells at the tap points, while increasing with distance for other pixels. Typical amounts for the kick-down voltage variations in today's AMLCD's are below 50 mV. While such variations for conventional two-edge matrix addressing are gradual over the pixel array and therefore not necessarily visible, patterns in the magnitude of the kick-down voltages will be introduced for unconventional access wiring. Such patterns may become clearly visible during normal drive voltage uniformities in today's AMLCD's. Resistive and inductive line effects have much less impact. Therefore any compensation or equalization is best done by adjusting the capacitances in the row and column drive circuits from the driver chips to the pixels. In typical AMLCD's per:unit area, metal-to-metal or metal-to-ITO overlap capacitances on the same substrate are about 30 times larger than metal-to-ITO capacitance with conductor located on opposite substrates. The former types of capacitances are thus more effective in adjusting capacitances.

Figure 14:
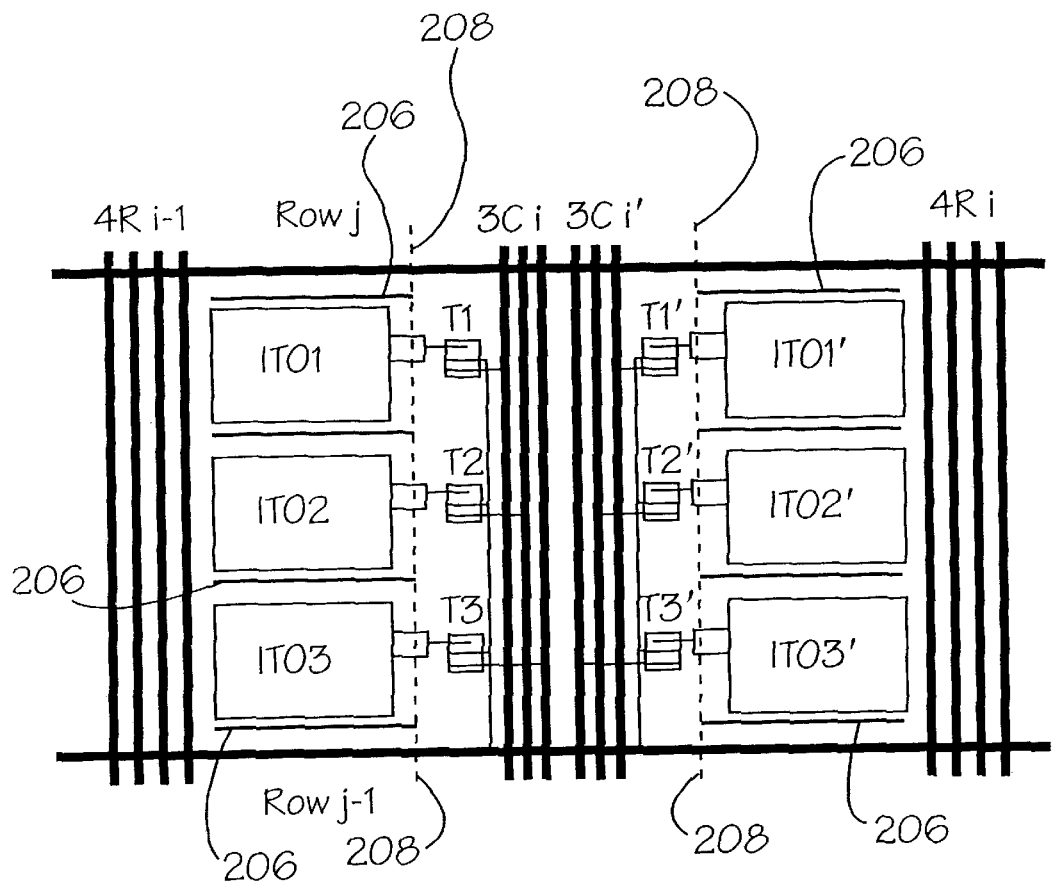
FIG. 14 illustrates the layout of a field shield electrode placed between the liquid crystal cell electrode and thin film wiring in order to equalize capacitive coupling of all LC cells.

The insight discussed above has been verified by extensive circuit simulations for several large AMLCD designs with a pixel pitch on the order of 1 mm. The resulting understanding has led to the following corrective design procedures that can be applied to suppress pixel drive voltage level and waveform variations to a degree that they no longer are visible under the intended viewing conditions of display:

1) Design the layout of each sub-pixel aperture such that its capacitive interactions with other conductive materials becomes essentially equal. This can be accomplished rearranging the layout of the sub-pixel, adjusting distances to proximate conductors, and inserting grounded or floating field shields between the sub-pixel and adjacent conductive structures (FIG. 14).

2) Design the layout of each sub-pixel such that the total cell capacitance, including the LC capacitance and any storage capacitors used to stabilize the cell voltage, as well as the cell to row line coupling capacitance, including TFT gate-to-drain and gate-to-source capacitance, as applicable, are equal in all pixels. The best way to achieve this is to make all cell layouts identical.

Figure 15:
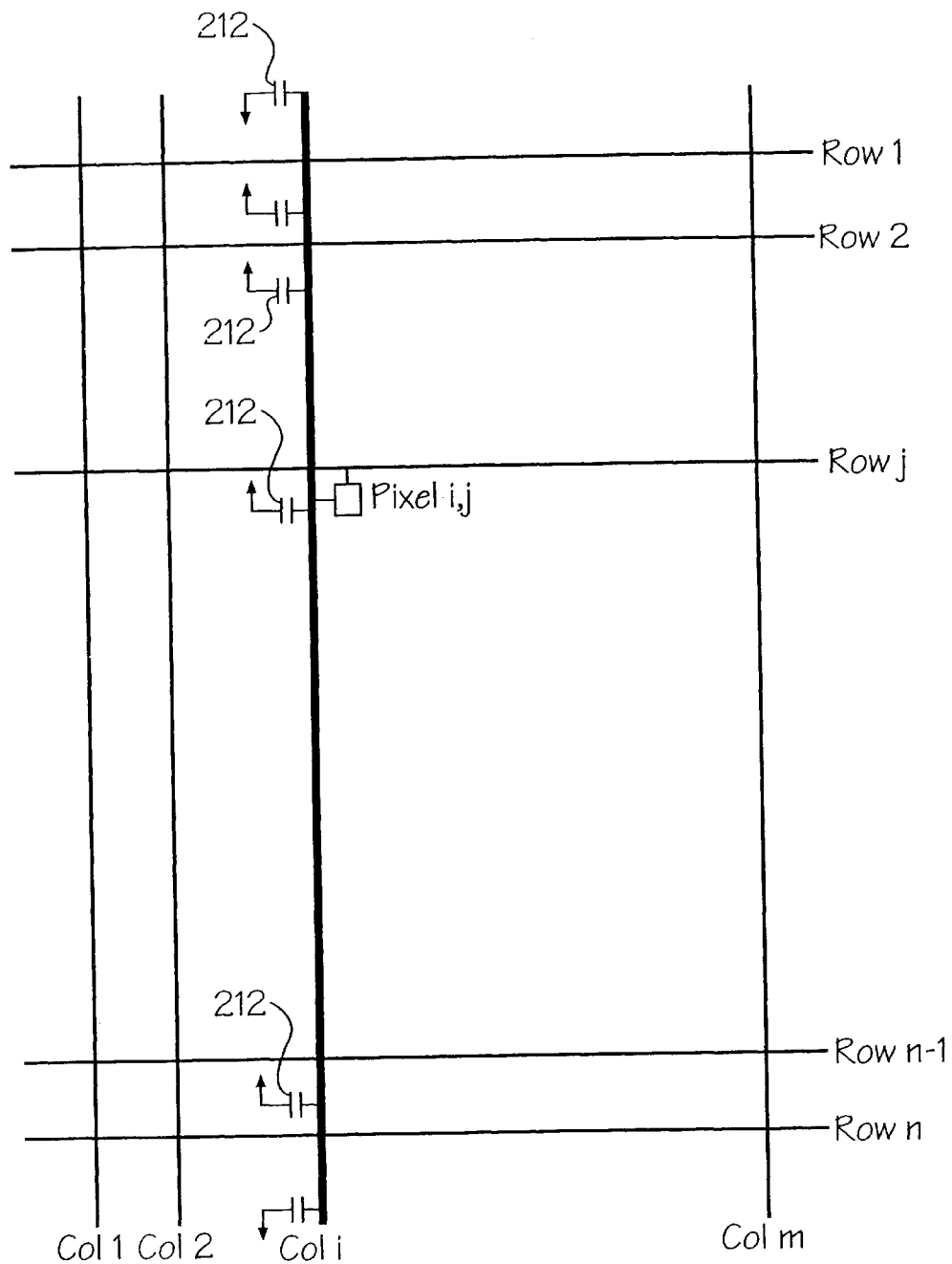
FIG. 15 illustrates distributed or discrete capacitance along column interconnections in order to equalize the apparent capacitance seen by the liquid crystal cells.

3) Equalize all distributed column line capacitance, including line body components, fringing field capacitances, overlap capacitances with other conductors, and any column line-to-column line coupling capacitances by adjusting the line width and line spacing of column lines, and possibly by adding small discrete capacitance along the body of the column line (FIG. 15). Metal-to-metal overlaps provide the most area efficient adder. Line-to-line coupling capacitance appear in designs in which multiple column lines run in common wiring channels across the pixel arrays. Such an arrangement is especially useful in tiled displays as described in United States patent application RDI-128, but possibly also in large monolithic displays. Line width/space adjustments can be guided by two-dimensional capacitance simulations, which are well known to persons skilled in the art of integrated circuit design.

Figure 16:
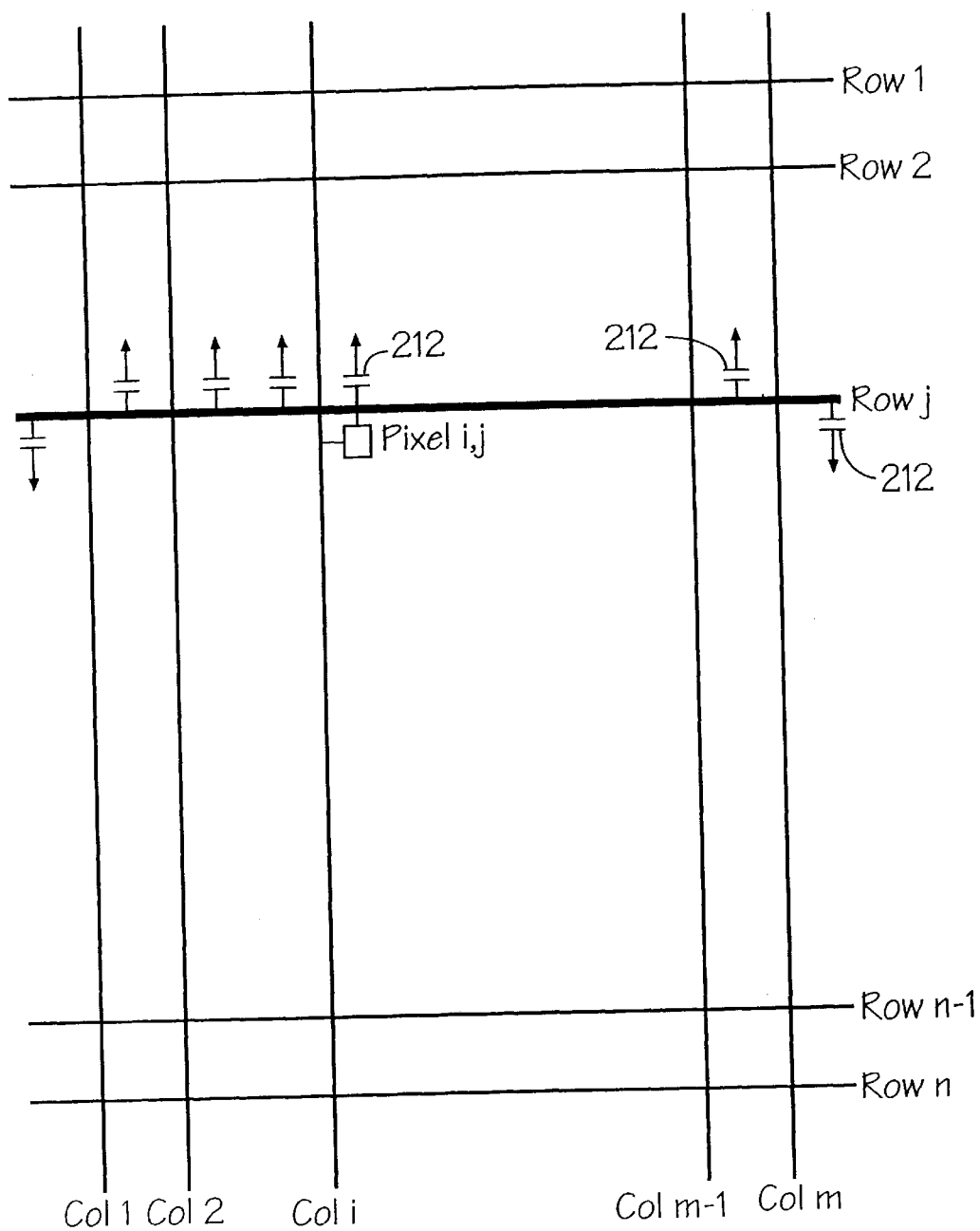
FIG. 16 illustrates distributed or discrete capacitance along a row in order to equalize the apparent capacitance seen by the liquid crystal cells.

4) Equalize all distributed row line capacitances, including line body components, fringing field capacitances, overlap capacitances with other conductors, and any row line-to-row line coupling capacitances by adjusting the line width and line spacing of row lines, and possibly by adding small discrete capacitance along the body of the row line (FIG. 16). Metal-to-metal overlaps provide the most area efficient adder. Line-to-line coupling capacitances appear in designs in which multiple row lines run in common wiring channels across the pixel arrays. Such an arrangement is especially useful in tiled displays as described in United States patent application RDI-128, but possibly also in large monolithic displays. Line width/space adjustments can be guided by two-dimensional capacitance simulations, which are well known to persons skilled in the art of integrated circuit design.

Figure 17:
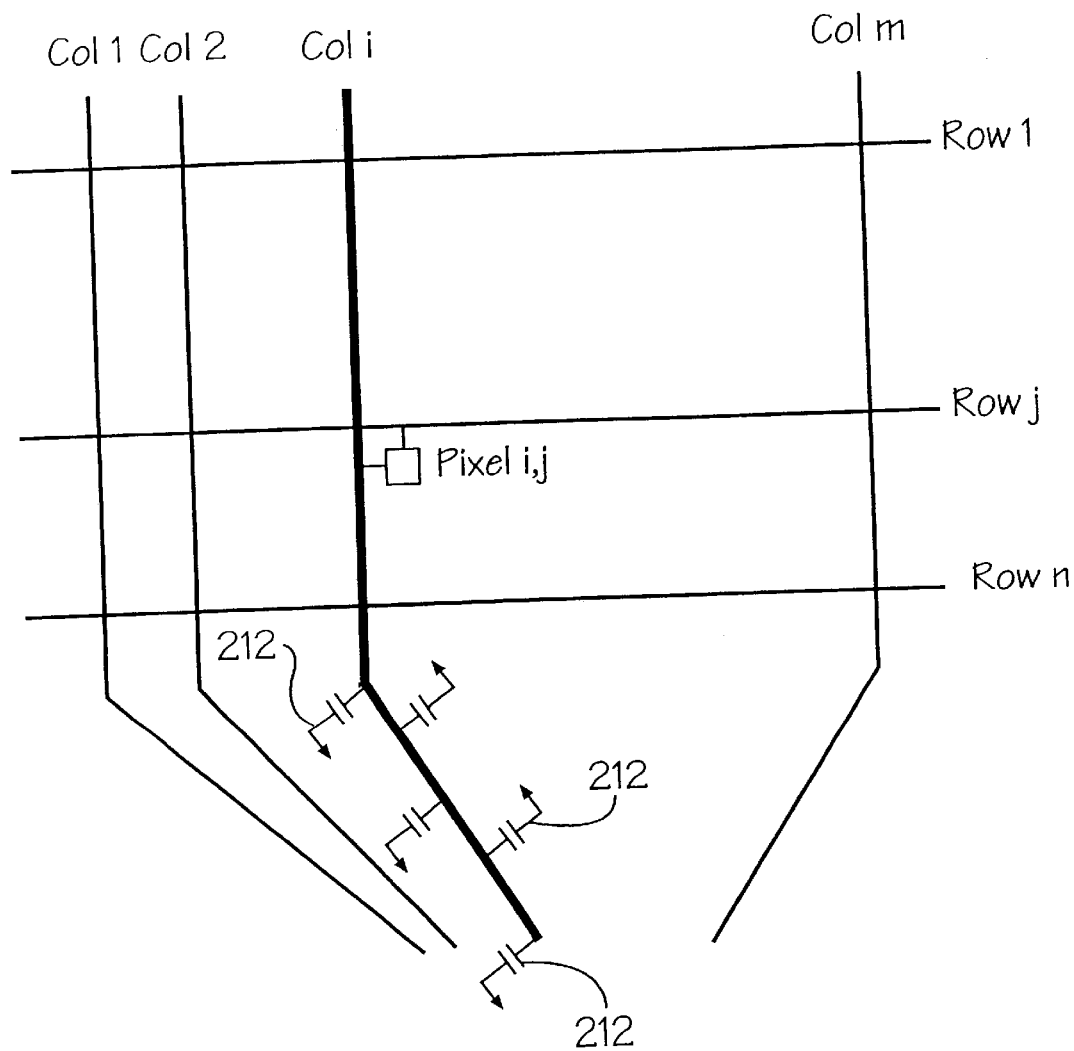
FIG. 17 illustrates distributed or discrete capacitance along column fan-out lines in order to equalize the apparent capacitance seen by the liquid crystal cells.

5) Equalize the distributed row and column fan-out line capacitances that run from driver chips to the edge or row and column lines at the edge of the pixel array (FIG. 17). These capacitances include line body components, fringing fields, and overlap capacitances that depend on the layout of said access lines. While such fan-out lines generally have a very simply layout with few, if any crossovers, in FPD's with two-sided or four-sided pixel array access, layouts especially for single sided access are very complex. Both line lengths and the number and geometry of line-to-line crossovers varies greatly. As a consequence the total distributed line capacitance also will vary. Equalization can be done by adjusting the width of the line, adjusting the line spacing, and adding additional overlap capacitance over the length of the line. Metal-to-metal overlaps provide the most area efficient adder.

Figure 18:
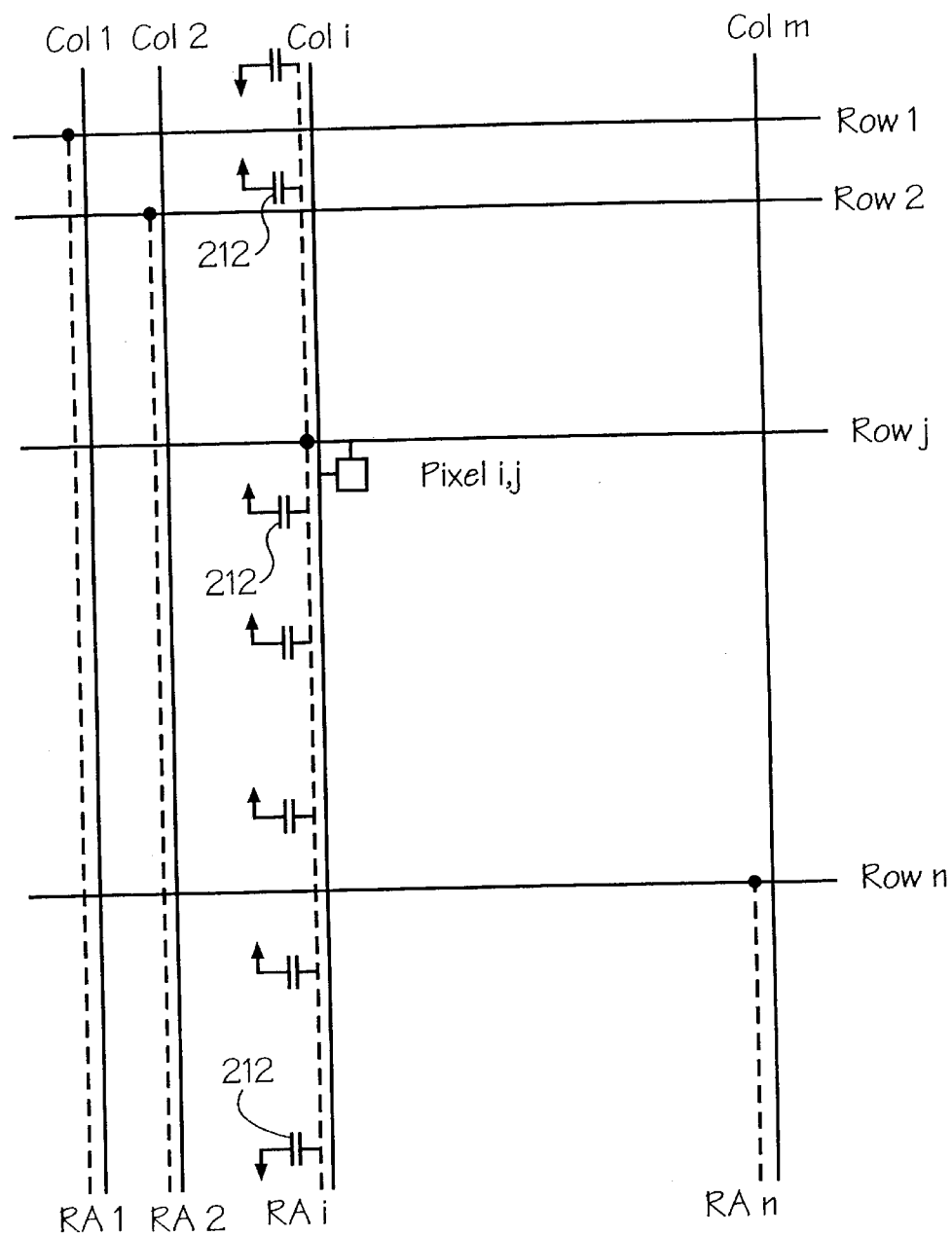
FIG. 18 illustrates distributed or discrete capacitance along row access lines in order to equalize the apparent capacitance seen by the liquid crystal cells.

6) Equalize any distributed row or column access line capacitances that are used in the display to connect row or column fan-out lines, respectively, to row and column lines running within the pixel array to implement matrix addressing. These capacitances include line body components, fringing fields, and overlap capacitances that depend on the layout of said access lines. For example, for single edge access both horizontal row lines and vertical column lines must be accessed from the same edge. If the column line edge is chose for access, column lines would be directly accessible with the column fan-out lines, but separate row access lines would be needed as described in United States patent application RDI-128. Such row access lines would be routed in vertical wiring channels parallel with the column lines as illustrated in FIG. 18. Each row access line shall then be connected to one row line at a tap point within the pixel array. As a consequence, row access line lengths will vary from zero to the full height of the pixel array. Equalization can be done by extending row or column lines beyond the tap points, adjusting line width, adjusting the line spacing, and adding additional overlap capacitances over the length of the line either in discrete chunks or as a continuous structure. Equalization should be done such that the row or column drive circuit impedance from the pixels connected to that row or column line become closely matched. The first order goal is to match the total capacitance in said row or column drive circuit. The refinements into the amount of added capacitance is its best distribution can be determined using circuit simulation. Metal-to-metal overlaps provide the most area efficient adder.

Figure 19:
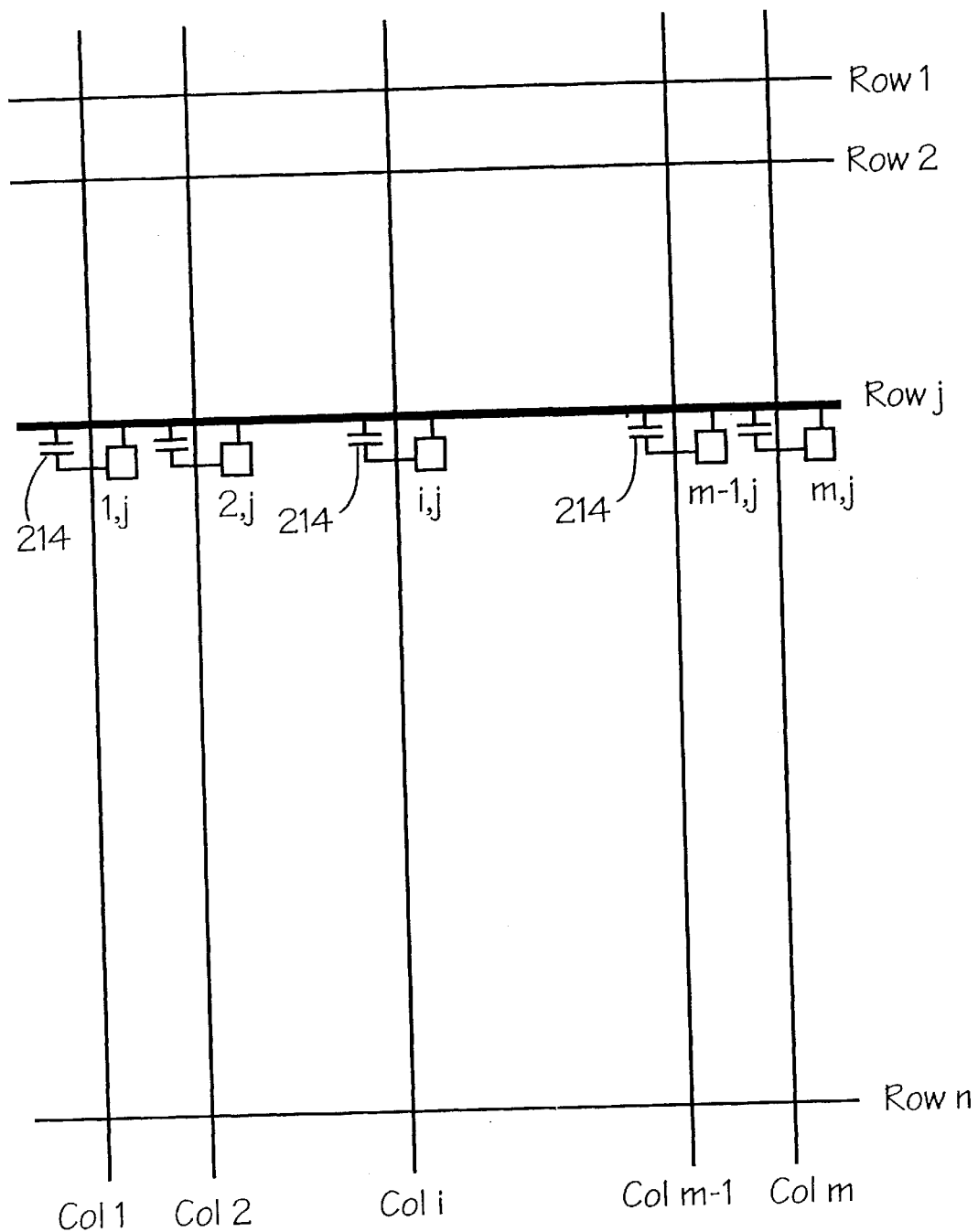
FIG. 19 illustrates the adjustment of row-to-liquid crystal cell coupling capacitance in order to control kick-down voltage variation for pixels along said row line.

7) The final design technique for controlling pixel voltage level and waveform uniformities in large monolithic and tiled displays is based on adjusting the pixel layout as a means for compensation. For example, as stated above the magnitude of the kick-down voltage in the LC cell decreases with the distance to the tap point or the output lead of the driver chip, whichever is directly connected to the row line. On the other hand, the magnitude of the kick-down voltage is proportional to the coupling capacitance between the LC cell and the row line. Therefore a reduction of the kick-down voltage with position can be compensated for by increasing the coupling capacitance monotonically with distance from the tap point or driver chip output lead (FIG. 19). Similarly the coupling capacitance can be decreased as a function of cell location thus reducing the magnitude of the kick-down voltages. These measures change the shape of the LC holding voltage curve as a function of position. The holding voltage curve can also be rigidly moved up or down, if the same amount of capacitance is deducted or added from the coupling capacitance of the sub-pixels along a chosen row line. The easiest way to enhance or lower the coupling capacitance is to increase or decrease, respectively, the area of the overlap between the row and column lines serving the sub-pixel in question. Alternatively, the gate-to-drain overlap capacitance can be used to adjust coupling capacitance or additional overlap capacitances can be placed into the dark areas of the sub-pixels. Whichever way is chosen, all of them lead to relatively simple changes in the layout of the sub-pixel or pixel.

Figure 20:
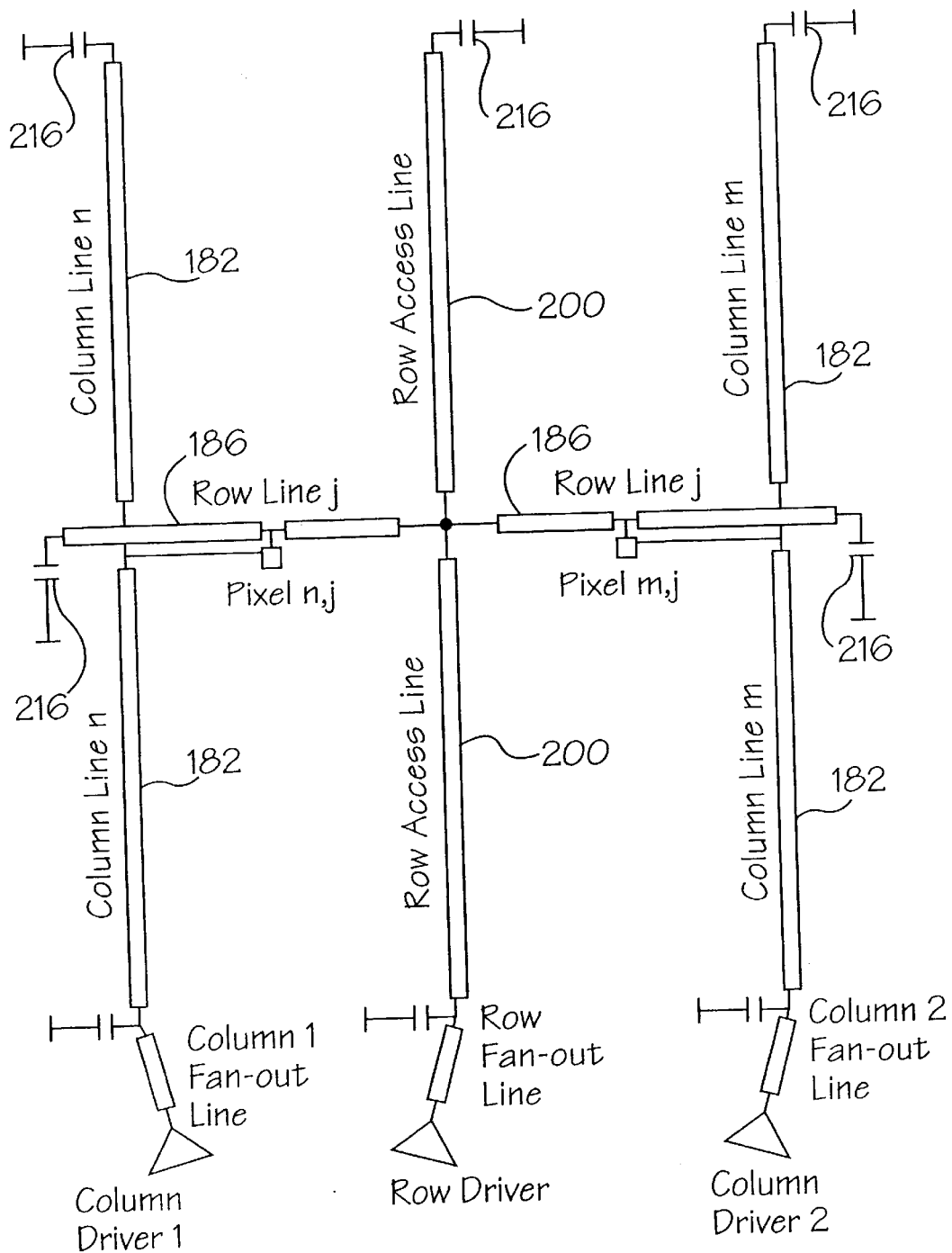
FIG. 20 depicts a system level circuit diagram for two AMLCD cells with single edge addressing for use in circuit simulation of equalization of cell voltage levels and waveforms.

A preferable approach to deciding which of the above capacitive equalization techniques to implement is best determined by circuit simulation. A typical circuit diagram for these simulations is given in FIG. 20. Simulations can predict drive voltage level and waveform variations and the emergence of any electronic gradients, steps, boundaries, or patterns over the pixel array. Given such a model, the circuit simulator in combination with measured electrical data for the display, or alternatively simulated electrical data derived from two-dimensional electromagnetic field or device simulations, can be used to evaluate and fine-tune each of the above capacitive equalization techniques for the large monolithic or tiled FPDs in question. The required circuit, electromagnetic field, and device simulation tools are well known to those familiar with modern integrated circuit design techniques.

The above non-uniformities originating from the details of the underlying electronic circuits are all second order effects that may, or may not be fully suppressed below the visual threshold of a critical viewer. It may be desirable to use additional luminance and chromaticity correction techniques and algorithms as disclosed in RDI-118 for smoothing visual artifacts in order to reach the final image quality level in a large monolithic or tiled display. A conservative approach is to make the correction data memory so large that every pixel can be corrected. This may still be economical for SDTV consumer applications with 852×480 pixels, and become impractical in HDTV AMLCDs with pixel array sizes of 1280×768, or larger. Hence, it will be advantageous to implement many of the above capacitive equalization techniques, so that the amount of brightness and color correction electronic circuitry and corrective computations required don't exceed cost budget allocated for these functions.

Figure 21:
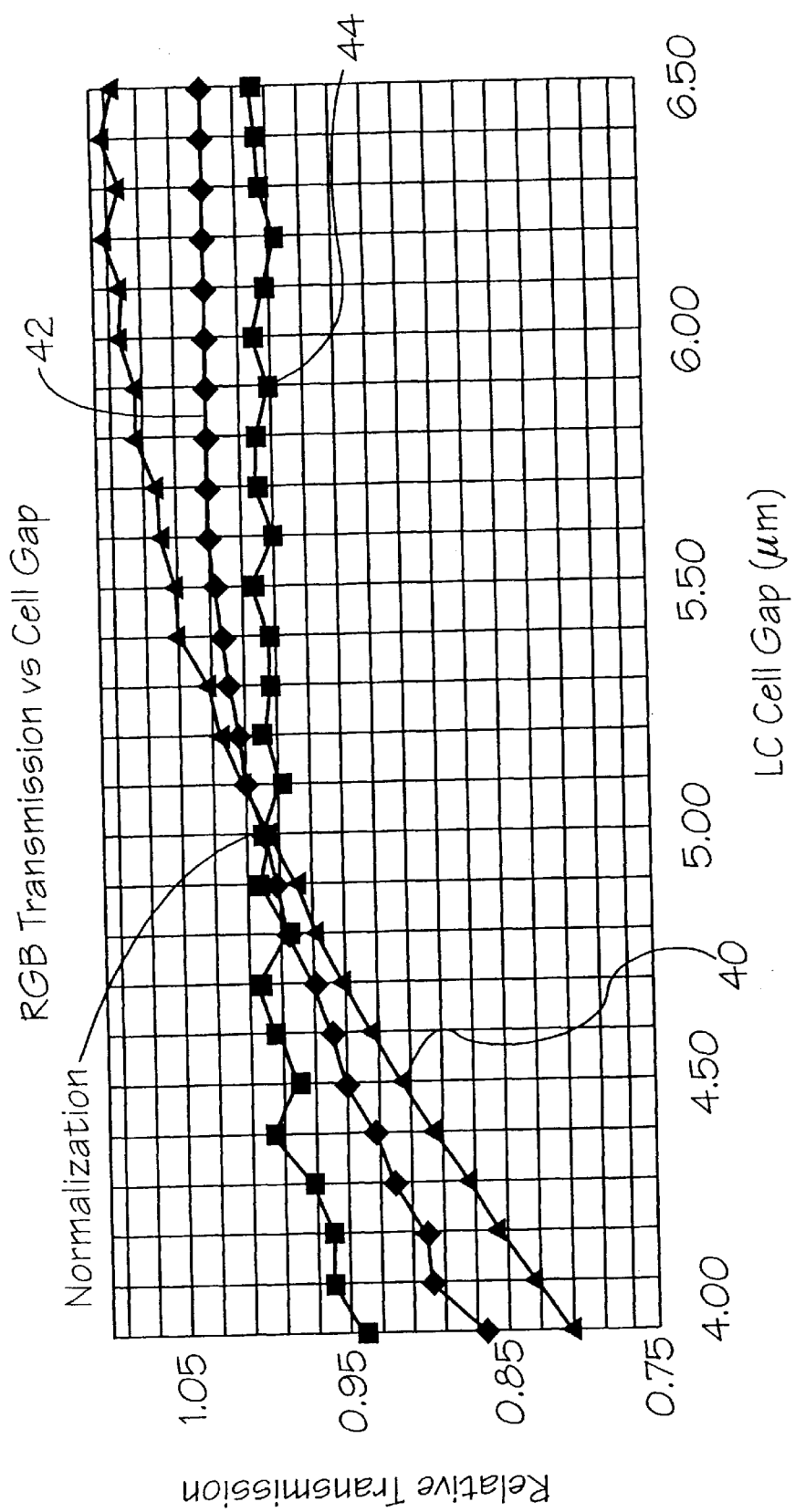
FIG. 21 shows the normalized transmission (proportional to luminance) of liquid crystal cell as a function of cell gap for typical red, green, and blue light.
Figure 22:
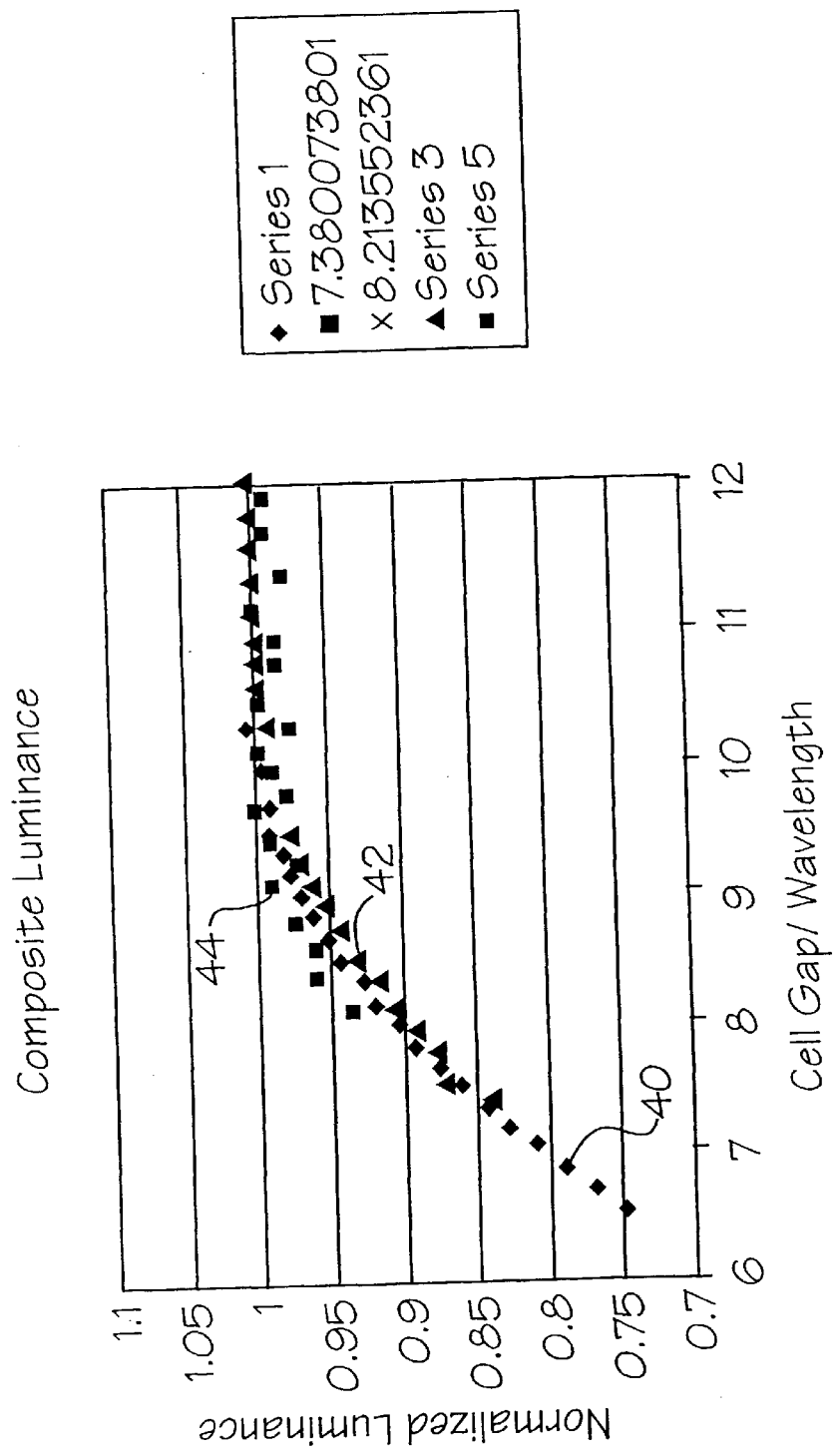
FIG. 22 depicts the normalized luminance of a typical LC cell as a function of the cell gap height-to-wavelength ratio.

In FIG. 21, the typical simulated normalized luminances of the sub-pixels in an LCD cell are plotted as functions of the optical length of the cell gap for red 140, green 142 and blue 143 light with wavelengths of approximately 612, 542, and 487 nm, respectively. The optical length was determined by the ratio of cell gap and the wavelength of light. This is the fundamental parameter that locally determines the optical retardation of light rays passing through the color valves and the light flux emanating from the cell. Therefore the balance between the primary color fluxes (color balance) changes spacially as the cell gap varies. Now referring to FIG. 22, the typical simulated normalized luminances of the sub-pixels in a LCD cell are plotted as a function of the optical length of the cell gap for red 140, green 142 and blue 144 light with wavelengths of 612, 542, and 487 nm respectively. The optical length was determined by the ratio of the cell gap and the wavelength of light.

Figure 23:
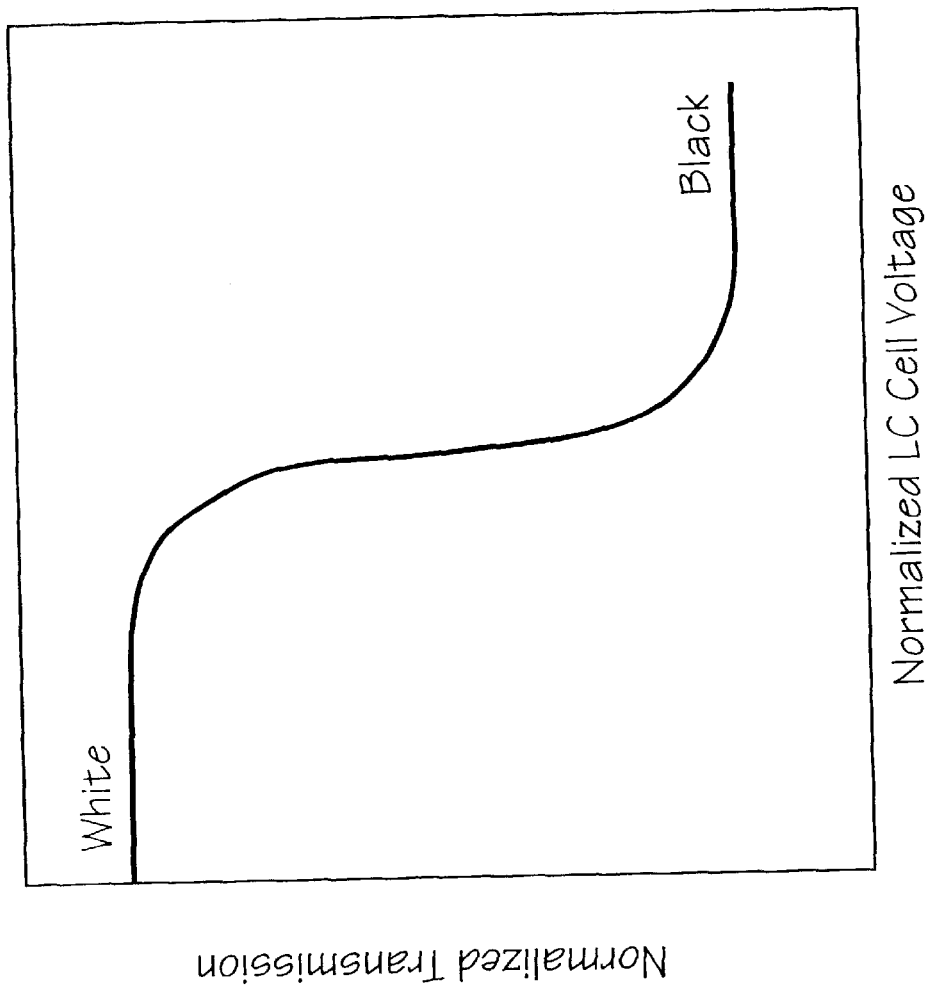
FIG. 23 illustrates a normalized effective T-V for an LC cell in a typical AMLCD.

Therefore, it is desirable to correct pixels with slightly different effective T-V curves (FIG. 23) and other small optical, electro-optical, ambient light, electronic, mechanical, or materials anomalies over the pixel array of the display by changing the drive signals in order to make their appearance across the large monolithic display more uniform. Such corrections can either be done by matching or blending the absolute luminance and chromaticity values defined in the nominal design, or by matching and/or blending the relative luminance and chromaticity values of one or multiple reference areas on the display, preferably located in the interior of the large array of pixels. Consequently absolute or relative luminance levels of the sub-pixels close to the boundaries of non-uniform luminance or chromaticity varying areas will be within the visual perception threshold of the nominal design or reference area specifications of pixels in the interior of the AMLCD. Therefore, input data for each pixel according to this invention is replaced with new data from a correction procedure. This new data will be sent to commercially available column (data) driver chips connected electronically to the liquid-crystal display in the conventional manner. Any correction data will be calculated in advance by applying the inverse of the transfer function to the domain of the input data, or input code range. The is correction data may he different for each pixel or group of pixels of the display, thus accounting for the difference in the characteristics of each pixel. A lookup table is one possible implementation for such a correction algorithm. Fortunately, such a correction scheme would result in a design that if necessary could be implemented economically for a large number of pixels using present state-of-the-art electronics. However, it is preferable to describe the deviations in the effective T-V curves of the sub-pixels in a manner that greatly reduces the amount of data that must be stored and accessed, as well as the amount of computation that must be performed for the video signal corrections during display operation. A knowledge of the mechanisms discussed herein and in RDI-118 focuses the physical design of the display and the gray scale color shifts to minimize the amount of correction.

A large variety of mechanisms causing luminance and chromaticity variations in tiled FPDs and the correction methods for them have been disclosed in the U.S. patent application RDI-118. The mechanisms giving rise to artifacts in monolithic displays discussed above may be corrected by applications of software and electronics with substantially identical methods to those disclosed in RDI-118. For convenience to the reader a brief summary of these correction methods will be provided below, suitably modified to apply to large monolithic displays.

It is known that the effective transmission-voltage (T-V) curves, or gamma curves, for AMLCDs, whether representative of the nominal design or differing from it because of reasons described above, are continuous functions. Therefore, the differences between a deviant and the nominal effective T-V curve is not only a continuous function, but generally a rather smooth function on the scale of the least significant bit of the data driver. Such a shift leaves the white and black states unchanged but greatly affects gray scale levels in between for each sub-pixel and hence through the mixing of the primary colors also the color balance.

Since it is assumed that the deviations of the effective T-V curves from the nominal vanish for white and black fields, an assumption that is usually justified because of the basic operation mechanism of the LC cell, an effective T-V curve, or the difference between two effective T-V curves, can therefore be described or approximated by dividing the domain of the function (or input code range) into finite pieces, and then describing each piece in a simple manner that is easy to compute in real time. Because of the smoothness and the generally small deviations from the nominal, one possibility is to describe-each piece by a linear function (piece-wise linear approximation). Then only the slope and offset would need to be stored to describe each piece. Consequently, the inverse transfer function (correction) for each piece would also be a linear function for each pixel or set of essentially identical pixels on the large monolithic display.

Because individual LCD panel areas are made from multiple continuous sheets of material, such as glass and organic films, the deviations in the cell gap or other physical properties will vary in a smooth and continuous manner compared to the pixel pitch (typically on the order of 1 mm or less in large displays). Therefore, these deviations may also be described using "contour mapping" or similar means to group regions of pixels, or bands of pixels, in a display that have transfer functions whose differences compared to the nominal design are imperceptible to a human viewer. Then, the transfer function for all pixels within a region or band could refer to one copy of a transfer function that represents the entire region or band. The corresponding inverse transfer functions could then be either simple or complex; however, since a number much smaller than the pixel count would be needed, such a correction scheme could be implemented using a practical amount of electronic hardware.

It is also known that effective T-V curves for AMLCDs, whether representative of the-nominal design or deviating from it because of reasons discussed above, have a very similar functional form. Therefore, a small number of reference T-V curves could be described in great detail, for example by using comprehensive lookup tables, as is done to define the T-V curves of commercial LCD driver integrated circuit chips. This small number of effective T-V curves of commercial LCD driver integrated circuit chips. This small number of effective T-V curves could be used to describe a much larger number of pixels by assigning labels to such T-V curves, and then developing a table of matching labels for the pixels. The characteristics of each pixel on the large monolithic display would be measured and compared with the reference effective T-V curves, and the label of the closest matching T-V curve would be selected.

Figure 24:
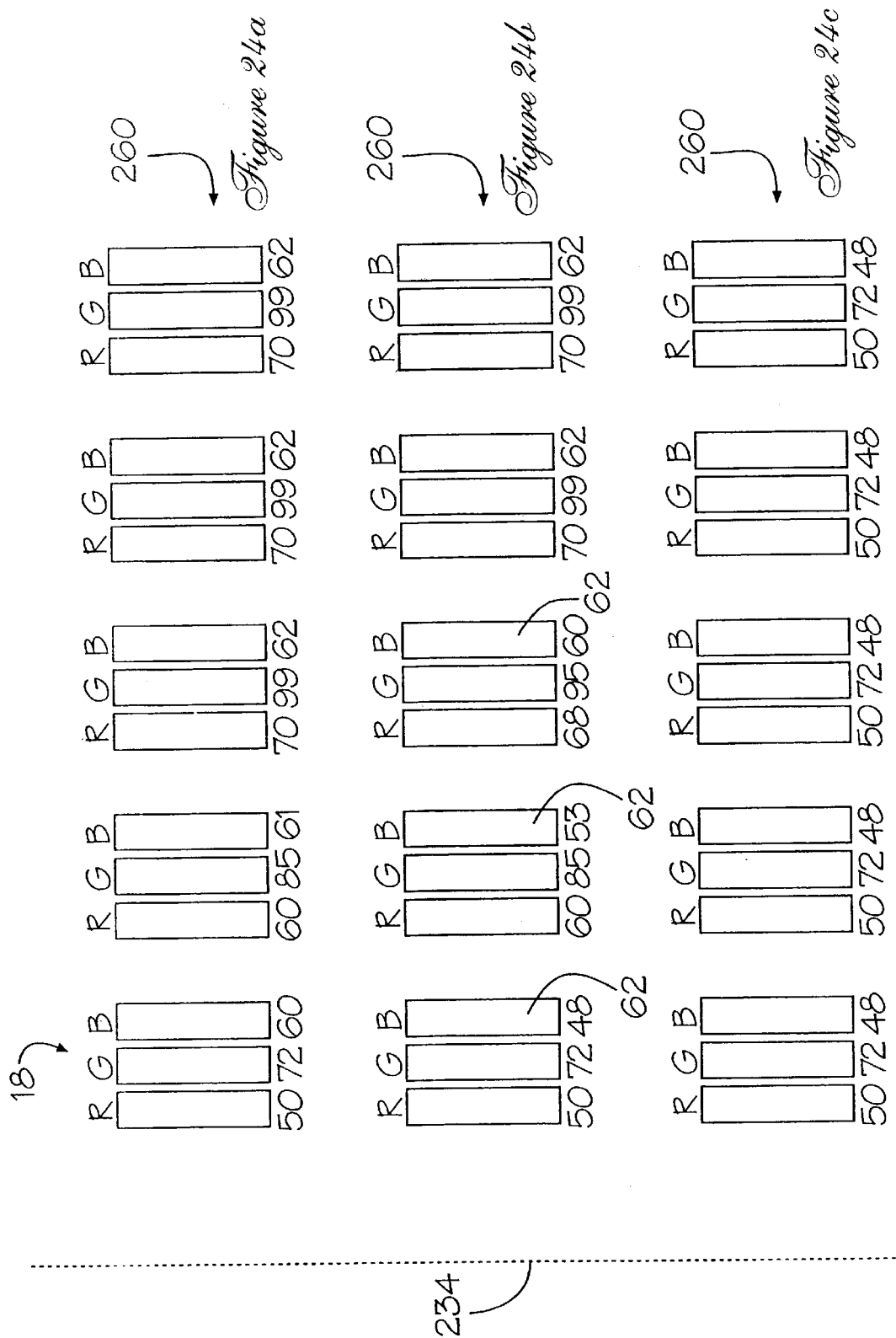
FIGS. 24a–24c show the normalized brightness data values for a row of pixels, FIG. 24a for a row of RGB sub-pixels for uncorrected data, FIG. 24b for a row of RGB sub-pixels for corrected data and FIG. 24c for a row of RGB sub-pixels corrected for uniform luminance.

FIG. 24a depicts the relative brightness values of RGB sub-pixels in a row of pixels from a boundary of an area of color non-uniformity in a large monolithic display. A uniform gray scale combination defines the input signals to the primary color sub-pixels. The boundary 34 is positioned to the left of the pixel row 60 in this figure and for example may be a contour line 48, 49, 174 in FIG. 8. The relative brightness values have been normalized into the usual 8 bit range, i.e., 0–255. The RGB signal values in the interior of the area of color non-uniformity, 70/99/62 respectively, correspond to the nominal drive signal values for this sample gray scale field. No corrections have been applied to the pixels in FIG. 24a. The corrections will be applied in two steps: first considering hue and second brightness.

It is desirable to maintain the ratio of the relative brightness of blue to green and red to green over the entire display so that no discoloration will become apparent to the viewer (hue correction). The color corrected relative brightness values are illustrated in FIG. 24b, where the relative brightness ratios between the primaries have been maintained approximately to the precision of the least significant bit. Electronic controls in color displays typically allow for 8 bit or 256 levels of "gray" for each primary color. The corrections should be done to the frame buffer onto the frame data presented to the display. This eliminates boundaries related to hue variations or non-uniformities over the large display.

However, these corrections do not restore the display to uniform luminance for uniform gray scale drive signals, because the sum of the relative brightness values varies over the entire display as shown in FIG. 8. FIG. 24c shows the relative brightness values of all the sub-pixels after they have been corrected for uniform luminance level everywhere. This correction can be achieved by applying a correction bit map image (not shown in this figure) to each incoming frame before the latter is sent to the data drivers (usually column) of the display. All pixel data will then be changed in accordance with the teachings of this invention. Sub-pixel data is adjusted such that the spectral output from the display is that of the desired hue and brightness uniformly across the entire pixel array of the display.

Figure 25:
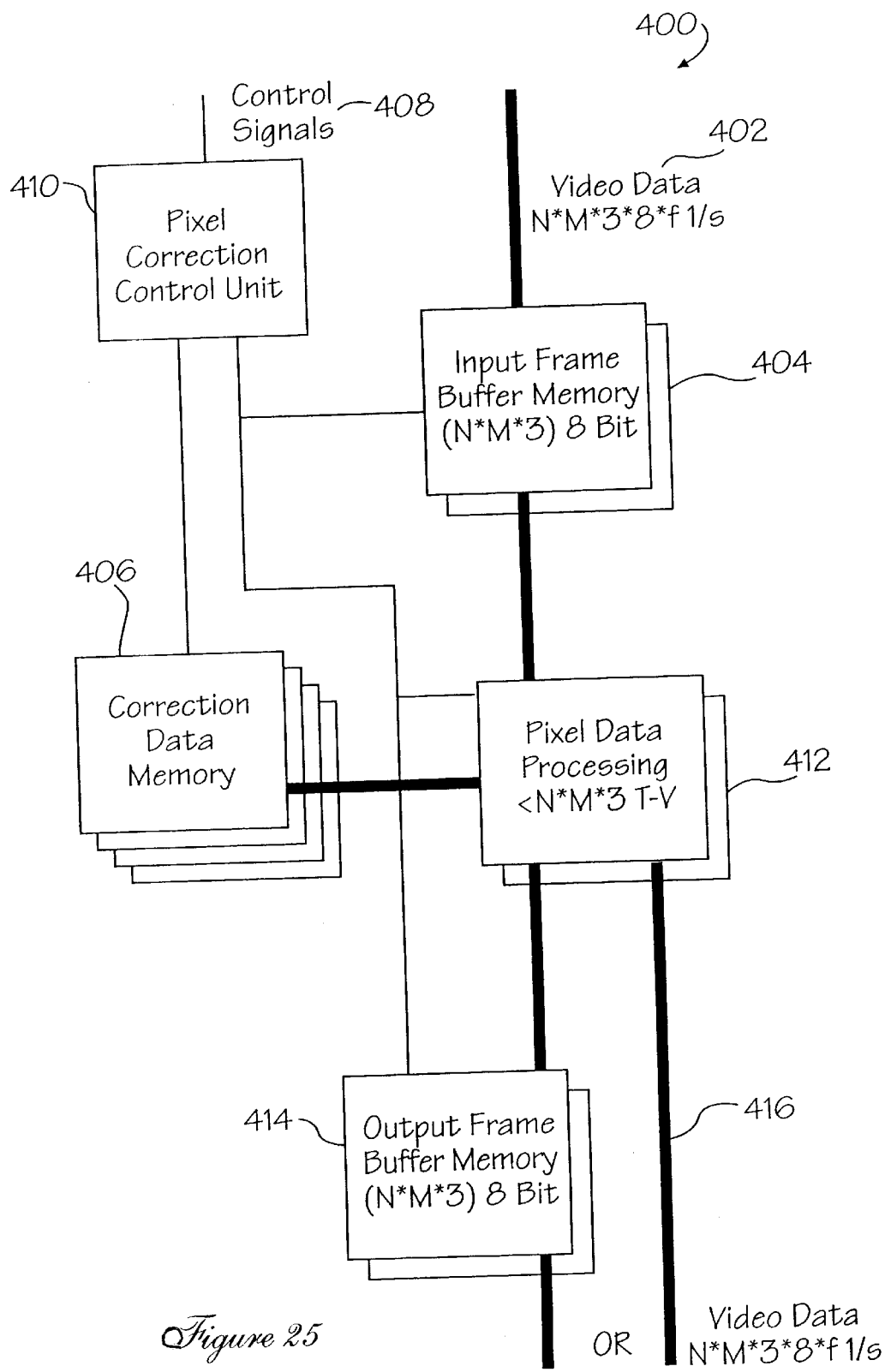
FIG. 25 illustrates a block diagram of one embodiment of a luminance and chromaticity correction circuit controlled by pixel correction control unit for a single pixel, sets of pixels, or all pixel corrections.

Now referring to United States Patent application RDI-118, an illustration of the block diagram level implementation of the general correction procedure FIG. 25 for 24 bit color is shown. Implementations for other color resolutions are similar and immediately obvious to those skilled in the art. The incoming video data is first temporarily stored in an input frame buffer memory. The video data is read from the input frame buffer and correction data from the correction data memory under the control of the pixel correction control unit into the pixel data processor. The correction data memory should be composed of non-volatile memory, or of volatile memory initialized to values stored in auxiliary non-volatile memory, or be initialized with values calculated from values stored in non-volatile memory. This ensures that correction data is not lost, when the display is powered down. The appropriate corrections to the pixel video data are then applied by performing electronic pixel data processing using one or more processing units. Since both incoming and corrected video data for each sub-pixel is comprised of a single n-bit integer number (usually 8-bit), all pixel data processing only needs be done to n bit precision. Once pixel data has been corrected, it can be sent directly into the display. In an alternate embodiment the pixel correction control unit is merged with the pixel data processing unit. Yet in another alternate embodiment corrected pixel data is collected into an output frame buffer memory before it will be sent to the display.

Sub-pixel data corrections can be accomplished in many ways. In one embodiment, sub-pixels are grouped according to their effective T-V curve response and then each group is assigned a previously stored response function specific to that group. Groups could, for example, include interior area sub-pixels for each bounded substantially uniform area, and edge pixels for each inner and outer edge of each boundary. As long as the number of groups is reasonable the amount of data for the response functions that must be stored in the correction data memory will be acceptable.

Since other modifications and changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

What is claimed is:

1. A monolithic, AMLCD display being a robust laminate and having controlled contrast, luminance and chromaticity across a wide view angle range, comprising:
   a) an AMLCD flat-panel assembly having a front, viewing face and a rear face, said front viewing face being substantially rectangular and having a diagonal measurement of at least approximately 19 inches;
   b) backlighting means comprising an array of tubular lamps disposed proximate and directly behind said rear face of said AMLCD flat-panel assembly for providing illumination thereto;
   c) light collimating means proximate said rear face and said backlighting means; and
   d) means for decollimating light proximate said front, viewing face of said AMLCD flat-panel for decollimating light therefrom, said means for decollimating light having a different directivities (i.e., decollimation efficiencies) in planes substantially parallel to a long said and a short side respectively of said substantially rectangular viewing face;

whereby said AMLCD flat-panel assembly achieves a viewing angle of more than 70 degrees off an axis perpendicular said viewing face and in a horizontal plane substantially parallel to a longer side of said of said substantially rectangular viewing face.

2. The monolithic, AMLCD display being a robust laminate and having controlled contrast, luminance and chromaticity across a wide view angle range as recited in claim 1, wherein said AMLCD flat-panel assembly comprises an optical stack, comprising:
   i) a liquid crystal TFT AMLCD display element;
   ii) at least one from the group of cover plate and back plate affixed to said display element.

3. The monolithic, AMLCD display being a robust laminate and having controlled contrast, luminance and chromaticity across a wide view angle range as recited in claim 2, wherein said means for decollimating light comprises a screen.

4. The monolithic, AMLCD display being a robust laminate and having controlled contrast, luminance and chromaticity across a wide view angle range as recited in claim 3, wherein said screen is disposed between a viewer of said display and said viewing face of said liquid crystal TFT AMLCD display element.

5. The monolithic, AMLCD display being a robust laminate and having controlled contrast, luminance and chromaticity across a wide view angle range as recited in claim 4, wherein said screen has a predetermined angular distribution of intensity of light exiting said display toward said viewer thereof.

6. The monolithic, AMLCD display being a robust laminate and having controlled contrast, luminance and chromaticity across a wide view angle range as recited in claim 5, wherein said predetermined angular distribution of intensity for light that exits said display.

7. The monolithic, AMLCD display being a robust laminate and having controlled contrast, luminance and chromaticity across a wide view angle range as recited in claim 3, wherein said screen comprises a first screen and a second screen, both disposed between a viewer of said display and said viewing face of said liquid crystal TFT AMLCD display element.

8. The monolithic, AMLCD display being a robust laminate and having controlled contrast, luminance and chromaticity across a wide view angle range as recited in claim 1, wherein said light collimating means comprises an optical collimator.

9. The monolithic, AMLCD display being a robust laminate and having controlled contrast, luminance and chromaticity across a wide view angle range as recited in claim 8, wherein said optical collimator comprises a brightness-enhancing film.

10. The monolithic, AMLCD display being a robust laminate and having controlled contrast, luminance and chromaticity across a wide view angle range as recited in claim 9, wherein said brightness-enhancing film comprises micro-geometric prismatic arrays.

11. The monolithic, AMLCD display being a robust laminate and having controlled contrast, luminance and chromaticity across a wide view angle range as recited in claim 1, wherein said light collimating means comprises a lattice having a predetermined cell structure having a shape from the group: square, rectangle, triangle, hexagon, circle, other polygon.

12. The monolithic, AMLCD display being a robust laminate and having controlled contrast, luminance and chromaticity across a wide view angle range as recited in claim 11, wherein said predetermined cell structure has at least one defined cell width.

13. The monolithic, AMLCD display being a robust laminate and having controlled contrast, luminance and chromaticity across a wide view angle range as recited in claim 12, wherein said at least one defined cell width is in the range of approximately 3 to 5 mm.

14. The monolithic, AMLCD display being a robust laminate and having controlled contrast, luminance and chromaticity across a wide view angle range as recited in claim 11, wherein said lattice structure is constructed of a material from the group plastic, paper, and aluminum.

15. The monolithic, AMLCD display being a robust laminate and having controlled contrast, luminance and chromaticity across a wide view angle range as recited in claim 11, wherein said lattice structure comprises an aluminum honeycomb lattice.

16. The monolithic, AMLCD display being a robust laminate and having controlled contrast, luminance and chromaticity across a wide view angle range as recited in claim 11, wherein said lattice cells have a predetermined depth which defines cell walls.

17. The monolithic, AMLCD display being a robust laminate and having controlled contrast, luminance and chromaticity across a wide view angle range as recited in claim 16, wherein said cell walls further comprise a wall treatment.

18. The monolithic, AMLCD display being a robust laminate and having controlled contrast, luminance and chromaticity across a wide view angle range as recited in claim 17, wherein said treatment comprises an optical surface treatment having at least one of the properties: absorbent, reflective, specular, diffuse.

19. The monolithic, AMLCD display being a robust laminate and having controlled contrast, luminance and chromaticity across a wide view angle range as recited in claim 17, wherein said lattice cell walls comprise a lower portion being nearest said backlighting means and an upper portion being nearest said rear face, said lower and said upper portions having different optical surface treatments thereupon.

20. The monolithic, AMLCD display being a robust laminate and having controlled contrast, luminance and chromaticity across a wide view angle range as recited in claim 19, wherein said surface treatment of said lower portion of said lattice is substantially specularly reflective and said surface treatment of said upper portion is substantially absorptive.

21. The monolithic, AMLCD display being a robust laminate and having controlled contrast, luminance and chromaticity across a wide view angle range as recited in claim 2, further comprising:
  e) light diffusing means proximate said backlighting means.

22. The monolithic, AMLCD display being a robust laminate and having controlled contrast, luminance and chromaticity across a wide view angle range as recited in claim 2, further comprising:
  e) at least one mask means disposed on at least one of said front and said back plates.

23. The monolithic, AMLCD display being a robust laminate and having controlled contrast, luminance and chromaticity across a wide view angle range as recited in claim 1, wherein said backlighting means comprises at least one from the group: diffuser, optical light collimator, lattice light collimator.

24. The monolithic, AMLCD display being a robust laminate and having controlled contrast, luminance and chromaticity across a wide view angle range as recited in claim 2, wherein said AMLCD flat-panel display assembly, comprising:
  iii) a liquid crystal TFT AMLCD display element;
  iv) at least one from the group of cover plate and back plate affixed to said display element;
by a substantially full face seal formed by an optically transmissive adhesive film having a predetermined elastic modulus and predetermined thickness range.

25. The monolithic, AMLCD display being a robust laminate and having controlled contrast, luminance and chromaticity across a wide view angle range as recited in claim 2, further comprising a front polarizer disposed between said front, viewing face of said AMLCD display and a viewer thereof for controlling and at least partially counteracting effects of ambient light entering said AMLCD display from said front face thereof, and being directed back toward said viewer.

26. A monolithic, AMLCD display being a robust laminate and having controlled contrast, luminance and chromaticity across a wide view angle range, comprising:
  a) a liquid crystal TFT AMLCD display element having a front, viewing face and a rear face, said front viewing face being substantially rectangular;
  b) a substantially transparent cover support plate resiliently affixed to said front, viewing face of said AMLCD display element and comprising a first mask and means for decollimating light having different directivities (i.e., decollimation efficiencies) in planes substantially parallel to a long said and a short side respectively of said substantially rectangular viewing face;
  c) a substantially transparent back support plate resiliently affixed to said rear face of said AMLCD display element and comprising a second mask;
  d) backlighting means having a front face for providing illumination to an AMLCD display element disposed proximate said back support plate; and
  e) at least one of the group light optical collimator, light enhancing film, light lattice collimator and light diffuser disposed intermediate said front face of said backlighting means and said back support plate.

27. The monolithic, AMLCD display being a robust laminate and having controlled contrast, luminance and chromaticity across a wide view angle range as recited in claim 5, wherein said screen is adhesively mounted on said AMLCD flat-panel display assembly minimizing refraction index discontinuities.

28. The monolithic, AMLCD display being a robust laminate and having controlled contrast, luminance and chromaticity across a wide view angle range as recited in claim 3, wherein said screen is selected from the group of diffusing, refractive and hybrid diffusing/refractive screens.

* * * * *